(12) United States Patent
Kayanuma et al.

(10) Patent No.: US 8,060,637 B2
(45) Date of Patent: Nov. 15, 2011

(54) PLAYBACK APPARATUS AND PLAYBACK CONTROL METHOD

(75) Inventors: Masashi Kayanuma, Kanagawa (JP); Kojiro Matsuyama, Chiba (JP)

(73) Assignee: Sony Corporation, Tokyo (JP)

( * ) Notice: Subject to any disclaimer, the term of this patent is extended or adjusted under 35 U.S.C. 154(b) by 484 days.

(21) Appl. No.: 12/002,586

(22) Filed: Dec. 18, 2007

(65) Prior Publication Data

US 2008/0162716 A1 Jul. 3, 2008

(30) Foreign Application Priority Data

Dec. 29, 2006 (JP) ................................. 2006-356774

(51) Int. Cl.
G06F 15/16 (2006.01)
(52) U.S. Cl. ...................................... 709/231; 709/219
(58) Field of Classification Search .................. 709/231, 709/219
See application file for complete search history.

(56) References Cited

U.S. PATENT DOCUMENTS

| | | | | |
|---|---|---|---|---|
| 5,553,220 A * | 9/1996 | Keene | ............................ | 345/520 |
| 5,642,422 A * | 6/1997 | Hon et al. | ........................ | 381/19 |
| 6,728,729 B1 * | 4/2004 | Jawa et al. | .................. | 707/104.1 |
| 2002/0002039 A1 * | 1/2002 | Qureshey et al. | ............. | 455/344 |
| 2004/0138948 A1 * | 7/2004 | Loomis | ............................ | 705/14 |
| 2005/0044254 A1 * | 2/2005 | Smith | ............................ | 709/231 |
| 2006/0179078 A1 * | 8/2006 | McLean | ..................... | 707/104.1 |
| 2006/0195509 A1 * | 8/2006 | Yoneda | ......................... | 709/203 |
| 2007/0025194 A1 * | 2/2007 | Morse et al. | ................. | 369/30.1 |
| 2007/0125852 A1 * | 6/2007 | Rosenberg | .................... | 235/435 |
| 2007/0169115 A1 * | 7/2007 | Ko et al. | ....................... | 717/174 |
| 2007/0214182 A1 * | 9/2007 | Rosenberg | ................ | 707/104.1 |
| 2007/0220552 A1 * | 9/2007 | Juster et al. | ..................... | 725/46 |
| 2007/0266065 A1 * | 11/2007 | Rosenberg | .................... | 707/205 |
| 2008/0298770 A1 | 12/2008 | Noguchi | | |

FOREIGN PATENT DOCUMENTS

| | | |
|---|---|---|
| JP | 09-182028 A | 11/1997 |
| JP | 2003-330623 A | 11/2003 |
| JP | 2006-018991 A | 1/2006 |
| JP | 2006-221723 A | 8/2006 |

* cited by examiner

*Primary Examiner* — Bunjob Jaroenchonwanit
(74) *Attorney, Agent, or Firm* — Wolf, Greenfield & Sacks, P.C.

(57) ABSTRACT

In a playback apparatus adapted to receive stream data transmitted from a server and play back the received stream data, attribute information is sequentially received from the server and stored in an attribute information buffer, and, on the basis of the attribute information stored in the attribute information buffer, a request is issued to the server to transmit stream data corresponding to the attribute information. The stream data received from the server is sequentially stored in a first-in-first-out stream data buffer. When an end part of the stream data being currently played back has been stored in the stream data buffer, attribute information corresponding to stream data to be played next is read from the attribute information buffer, and on the basis of this attribute information, a request is issued to the server to transmit the stream data to be played next.

11 Claims, 13 Drawing Sheets

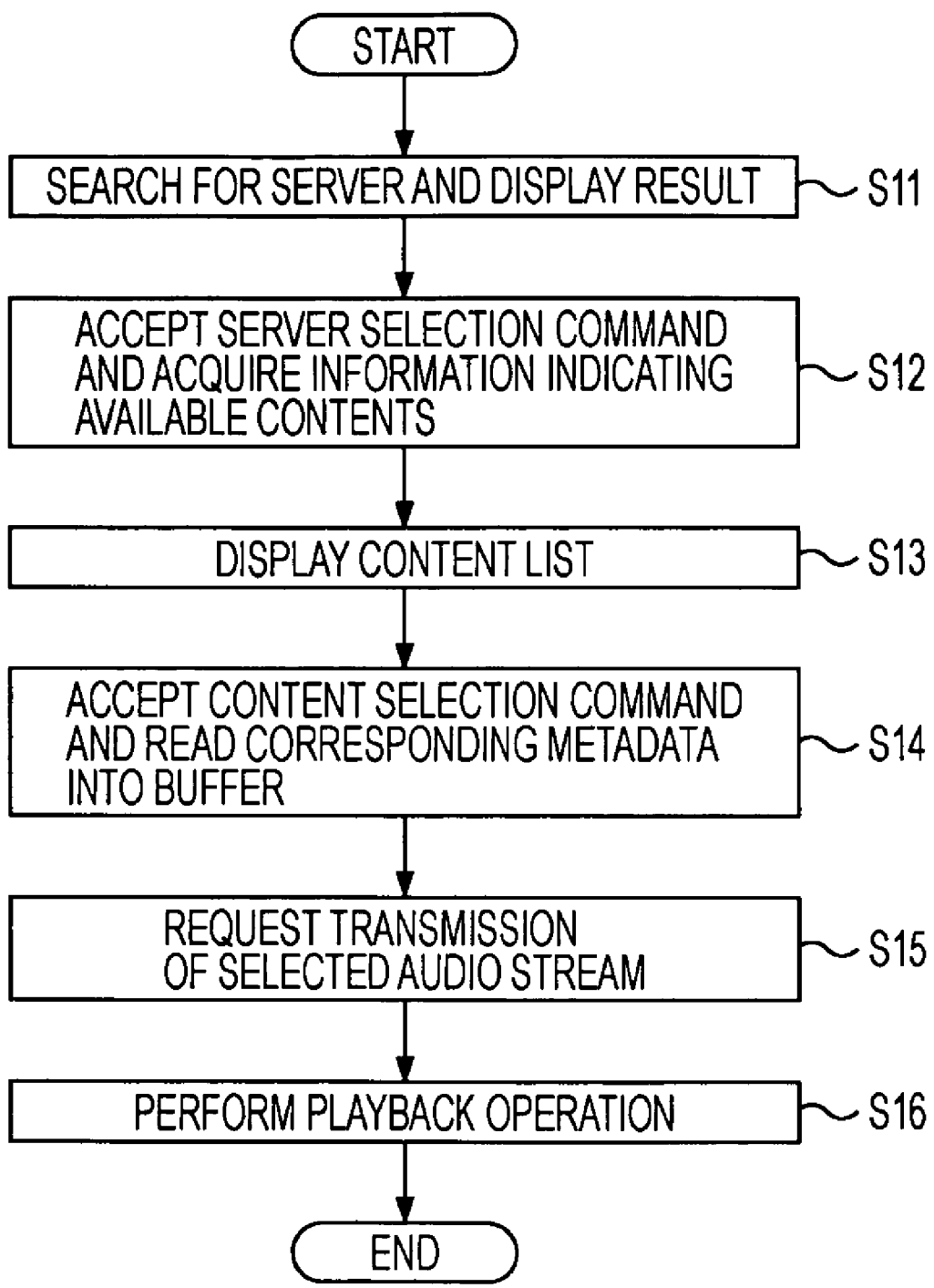

PLAYBACK APPARATUS AND PLAYBACK CONTROL METHOD

CROSS REFERENCES TO RELATED APPLICATIONS

The present invention contains subject matter related to Japanese Patent Application JP 2006-356774 filed in the Japanese Patent Office on Dec. 29, 2006, the entire contents of which are incorporated herein by reference.

BACKGROUND OF THE INVENTION

1. Field of the Invention

The present invention relates to a playback apparatus adapted to play back stream data and method of controlling a playback operation of a playback apparatus, and more particularly, to a playback apparatus and a playback control method of receiving stream data transmitted from a server connected to the playback apparatus via a network and playing back the received stream data.

2. Description of the Related Art

Audio/video contents are widely used in the form of digital data, and various apparatus for easily recording/playing digital data of audio/video contents are available. Great advances in network technology have been made, and thus it has become possible to easily build a home network system using a LAN (Local Area Network) or a wireless LAN.

Thus, it is desirable to provide a technique to easily transmit digital contents between devices in a home network system. In view of the above, efforts of establishing standards for procedures of connection between devices and control of contents are under way. One of such standards is UPnP (Universal Plug & Play) proposed by Microsoft Co., Ltd. of USA. The DLNA (Digital Living Network Alliance) guideline has been established based on the UPnP standard, and efforts of developing various devices according to the DLNA guideline are under way.

In the UPnP standard, UPnP devices are classified into three groups: media servers for providing contents, control points serving as control terminal devices, and media renderers serving as playback apparatuses. Note that the function of a control point may be implemented in a device serving as a media server or in a device serving as a media renderer.

A procedure (protocol) of communication between devices is defined in the UPnP standard, and it is possible to search for a UPnP device on a network and control an operation such as a playback operation of the UPnP device in accordance with the defined communication procedure. More specifically, for example, the control procedure allows a media renderer not only to transmit/receive content data from/to a media server but also to transmit content data to other media renderers (see, for example, Japanese Unexamined Patent Application Publication No. 2005-250867(paragraphs to 0097], FIG. 7)).

To play back audio/video stream data, it is necessary to control the storage of data such that as much stream data as required to properly perform a playback operation always exists in an input buffer of a decoder. Therefore, to continuously play back stream data of a plurality of contents, it is necessary to acquire stream data of a next content and start storing the acquired stream data into the input buffer of the decoder before playback of a previous content is ended.

One method of managing the input buffer of the decoder is to estimate playback times of respective input data which may be different in format, and control reading of data into the input buffer on the basis of the playback time for data existing in the input buffer thereby achieving playback of a plurality of data which may be different in format (see, for example, Japanese Unexamined Patent Application Publication No. 2005-182970 (paragraphs [0096] to [0116], FIG. 7)).

SUMMARY OF THE INVENTION

In a case of playback apparatuses including a fixed storage medium such as an HDD (Hard Disk Drive) or a removable storage medium such as an optical disk disposed therein, it is possible to previously get information indicating a storage location of stream data of each content, and thus it is possible to transfer stream data to the input buffer at a required high transfer rate. This makes it possible to read stream data of a next content to the input buffer of the decoder in a sufficiently short time in a continuous playback operation in which a plurality of stream data of different contents are played back continuously.

On the other hand, in a case where stream data of a content received via a network from a UPnP device such as a server is played back, the playback apparatus first acquires metadata associated with the content to be played back, and then the playback apparatus produces a request for the content according to information described in the metadata and sends the request to the server. Depending on the traffic state of the network, the requested metadata or stream data is not necessarily obtained in a maximum allowable period. Therefore, when stream data of a plurality of contents is played back by a playback apparatus, a break of voice/sound and/or image can occur at a boundary between contents.

In view of the above, it is desirable to provide a playback apparatus capable of receiving a plurality of stream data via a network and continuously playing back the received stream data, and a method of controlling a playback operation of such a playback apparatus.

According to an embodiment of the present invention, there is provided a playback apparatus adapted to receive stream data transmitted from a server connected to the playback apparatus via a network and play back the received stream data, comprising attribute information request means for requesting the server to transmit attribute information associated with the stream data and receiving the attribute information in the order in which to play back the stream data, an attribute information buffer adapted to temporarily store attribute information sequentially received from the server and retain at least attribute information associated with stream data to be played back next after stream data being currently played back, stream data request means for requesting, on the basis of the attribute information stored in the attribute information buffer, the server to transmit stream data corresponding to the attribute information, and a stream data buffer of a first-in-first-out type adapted to sequentially store the stream data received from the server and sequentially output the stream data to playback processing means, wherein when an end part of the stream data being currently played back has been stored in the stream data buffer, the stream data request means reads attribute information associated with stream data to be played next from the attribute information buffer, and requests, on the basis of the attribute information, the server to transmit stream data to be played back next.

In this playback apparatus, if the attribute information request means issues a request for transmission of attribute information of stream data, the attribute information is transmitted from the server in response to the request and received by the playback apparatus, in the order in which to play back the stream data. The received attribute information is sequentially stored in the attribute information buffer and temporarily retained therein. The attribute information buffer retains at least attribute information associated with stream data to be played back after the stream data being currently played back.

In accordance with the attribute information stored in the attribute information buffer, the stream data request means requests the server to transmit the stream data corresponding to the attribute information. If the stream data is transmitted from the server in response to the request, the received stream data is sequentially stored in the stream data buffer of the first-in-first-out (FIFO) type, and then output in the playback order. Thus, the stream data is sequentially stored in the stream data buffer in the order in which to play back the stream data, and is output therefrom in the playback order thereby achieving continuous playback of the stream data.

When an end part of the stream data being currently played back has been stored in the stream data buffer, the stream data request means reads attribute information associated with stream data to be played next from the attribute information buffer, and requests, on the basis of the attribute information, the server to transmit stream data to be played back next. Thus, without having to wait for completion of playback of stream data, stream data to be played next can be received and stored in the stream data buffer.

As described above, the present invention provides the following advantage. The attribute information of stream data to be played next after that being currently played is received and stored in the attribute information buffer before the end of the stream data being currently played back. When the end part of the current stream data has been finally stored in the stream data buffer, stream data to be played next is received from the server and stored in the stream data buffer. Thus, it is possible to continuously play back a plurality of stream data without having a break/pause between stream data regardless of the degree of traffic congestion of the network or the processing load imposed on the server.

BRIEF DESCRIPTION OF THE DRAWINGS

FIG. 9 is a flow chart illustrating a process performed by an audio playback apparatus to start a playback operation in a continuous playback mode;

DESCRIPTION OF THE PREFERRED EMBODIMENTS

The present invention is described in further detail below with reference to embodiments in conjunction with the accompanying drawings. In the following explanation, it is assumed, by way of example, that the present invention is applied to a LAN system (home network system) built in a home, and audio data is transmitted/received as content data via this LAN system.

Configuration of Home Network

Figure 1:
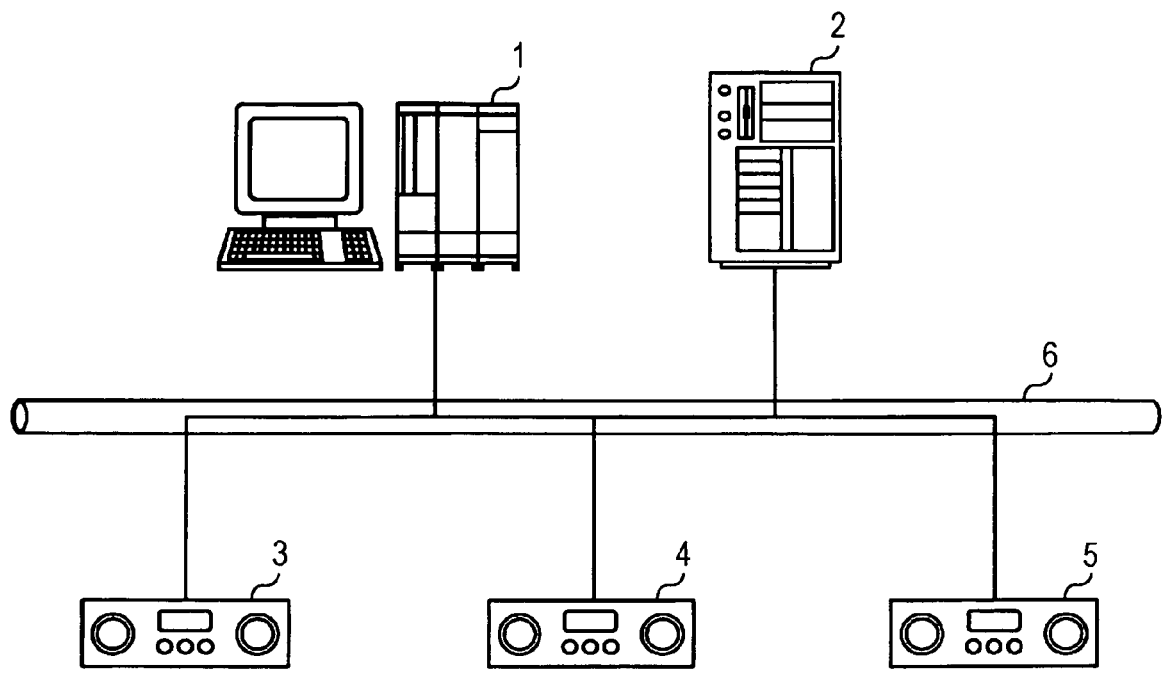
FIG. 1 is a diagram illustrating an example of a home network system according to an embodiment of the present invention.

FIG. 1 is a diagram illustrating an example of a home network system according to an embodiment of the present invention.

As shown in FIG. 1, the home network system includes servers 1 and 2 and audio playback apparatuses 3 to 5, which are connected to each other via a LAN 6.

The servers 1 and 2 may be implemented, for example, by an information processing apparatus such as a personal computer or an audio content recorder, having a capability of connecting to the LAN 6 and having a high-capacity storage medium such as an HDD. The servers 1 and 2 are capable of providing audio data stored in the HDD to the audio playback apparatuses 3 to 5 via the LAN 6. The audio playback apparatuses 3 to 5 each having a capability of connecting to the LAN 6 thereby to receive audio data transmitted from the server 1 or 2 via the LAN 6 and play back the received audio data.

In practice, the home network system is configured such that, for example, the servers 1 and 2 and the audio playback apparatuses 3 to 5 are connected via a broadband router. In this case, the broadband router has a function of serving as a DHCP (Dynamic Host Configuration Protocol) server for providing service to devices on the LAN 6 and also has a NAT (Network Address Translation) function, thereby allowing the devices on the LAN 6 to share an external communication line (such as a WAN (Wide Area Network)).

In such a home network system, the servers 1 and 2 have a capability of operating as an information providing apparatus for providing audio data, and the audio playback apparatuses 3 to 5 have a capability of operating as a client apparatus (information playback apparatus) for playing back audio data provided by the server 1 or 2, whereby users are allowed to enjoy listening to various audio contents provided by the server 1 or 2 using audio playback apparatuses 3 to 5. That is, each of the audio playback apparatuses 3 to 5 is capable of selecting one of the servers 1 and 2 as an audio data server depending on the audio data (audio content) to be played back.

Furthermore, in the present embodiment, the audio playback apparatuses 3 to 5 are configured to be capable of easily transmitting/receiving content data to/from electronic devices in accordance with the DLNA guide line. The DLNA guide line recommends that detection and control of an electronic device and management of content data should be performed in accordance with the UPnP standard proposed by Microsoft Co., Ltd. of USA.

The UPnP standard is designed to extend functions of standard Internet communication (TCP/IP communication) and the UPnP standard defines data formats and a set of protocols based on IP (Internet Protocol), TCP (Transmission Control Protocol), UDP (User Datagram Protocol), etc., for use on networks according to the IEEE (Institute of Electrical and Electronic Engineers) 802 standard which is widely used as a standard for network communication using 10/100BASE-T Ethernet (trademark).

By applying the UPnP to a CE (Consumer Electronics) device such as an audio playback apparatus, it becomes possible for the CE device such as an audio playback apparatus to easily perform mutual authentication with another CE device or personal computer and to provide or receive service via a network without users having to perform a complicated operation.

Overview of UPnP

Figure 2:
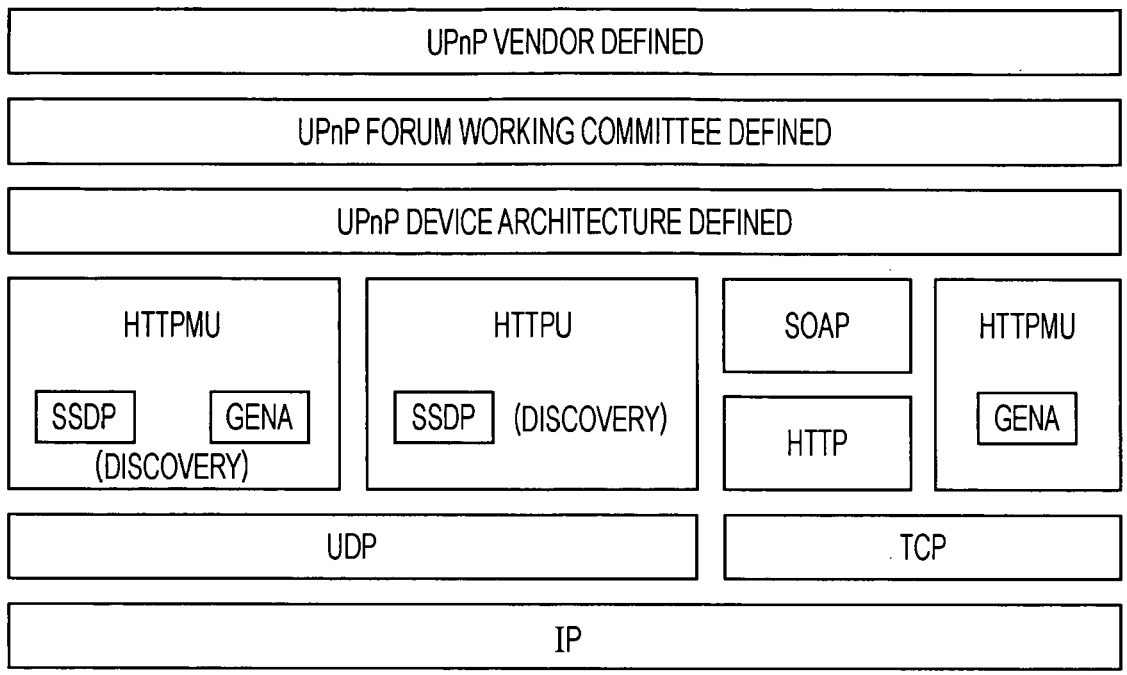
FIG. 2 is a diagram illustrating a UPnP protocol stack.

FIG. 2 is a diagram illustrating a UPnP protocol stack.

As shown in FIG. 2, in UPnP, actual transmission/reception of data is performed in accordance with the standard Internet protocol (IP), and functions specific to UPnP are realized using SSDP (Simple Service Discovery Protocol), GENA (General Event Notification Architecture), SOAP (Simple Object Access Protocol), HTTP (HyperText Transfer Protocol), etc.

Furthermore, as shown in FIG. 2, UPnP may include UPnP Vendor Defined protocols, UPnP Forum Working Committee Defined protocols, and UPnP Device Architecture Defined protocols.

The UPnP provides the following six functions: addressing, discovery, description, control, eventing, and presentation. These six functions provided by the UPnP are described below.

In a case of an electronic device such as an audio playback apparatus configured to operate according to the UPnP standard (hereinafter, such an electronic device will be referred to simply as a UPnP device), to use UPnP functions, audio data is handled in accordance with a UPnP AV architecture. The UPnP devices based on the UPnP AV architecture are classified into the following three types.

That is, in the UPnP AV architecture, UPnP devices are classified into the following three groups: media servers serving to provide contents, control points serving as control terminal devices, and media renderers serving as a playback apparatuses. The media server corresponds to an apparatus generally called a server in network systems. The media renderer corresponds to an apparatus generally called a client in network systems.

The control point (control terminal device) is a device adapted to control a UPnP device connected to a network. A control point may be installed in a media server or a media renderer, and a control point may be installed in some or all of electronic devices existing on a network. In the present embodiment, it is assumed, by way of example, that a control point is implemented in all of audio playback apparatuses 3 to 5.

Addressing provided by UPnP is a function for each UPnP device to acquire an IEEE802 network address of the UPnP device. In the addressing, DHCP or Auto-IP is used as a protocol.

Discovery is performed after addressing, by a control point to find a target device (a media server or a media renderer) to be controlled. In the discovery, SSDP is used as a protocol. When any electronic device in the network system is connected to the IEEE802 network, the electronic device broadcasts, over the IEEE802 network, a message indicating units included in the electronic device and services provided by the electronic device. The control point receives the broadcast message and analyzes the message to detect the device type of the electronic device connected to the IEEE802 network.

An SSDP packet output by an electronic device, to be controlled, found by a control point using the discovery function includes a URL (Uniform Resource Locator) described in a device description. The control point can access the URL to acquire further detailed device information of the electronic device from the device description.

The device information provided by the device description includes icon information, a model name, a manufacturer, a product name, and a service description associated with further detailed information about services provided by the device. From the device description or the service description, the control point acquires information as to how to access the target device. The device description and the service description are described in XML (extensible Markup Language).

The control functions include two sub functions: action and query. The action is performed in a manner defined by action information included in a service description. By invoking an action, a control point can control a target device. The query is used to extract a value (state variable) of device information from a service description. In the control, a transport protocol called SOAP is used, and the description thereof is performed using XML.

When a value of device information is changed, a message indicating this fact is sent using the eventing from the target device to the control point. In the eventing, a transport protocol called GENA is used, and the eventing is described in XML. The presentation is used to provide control means using a user interface to a user.

The UPnP functions described above allows UPnP devices not only to connect to a network for communication but also to automatically detect other UPnP devices and connect thereto without a user having to perform a complicated operation.

Figure 3:
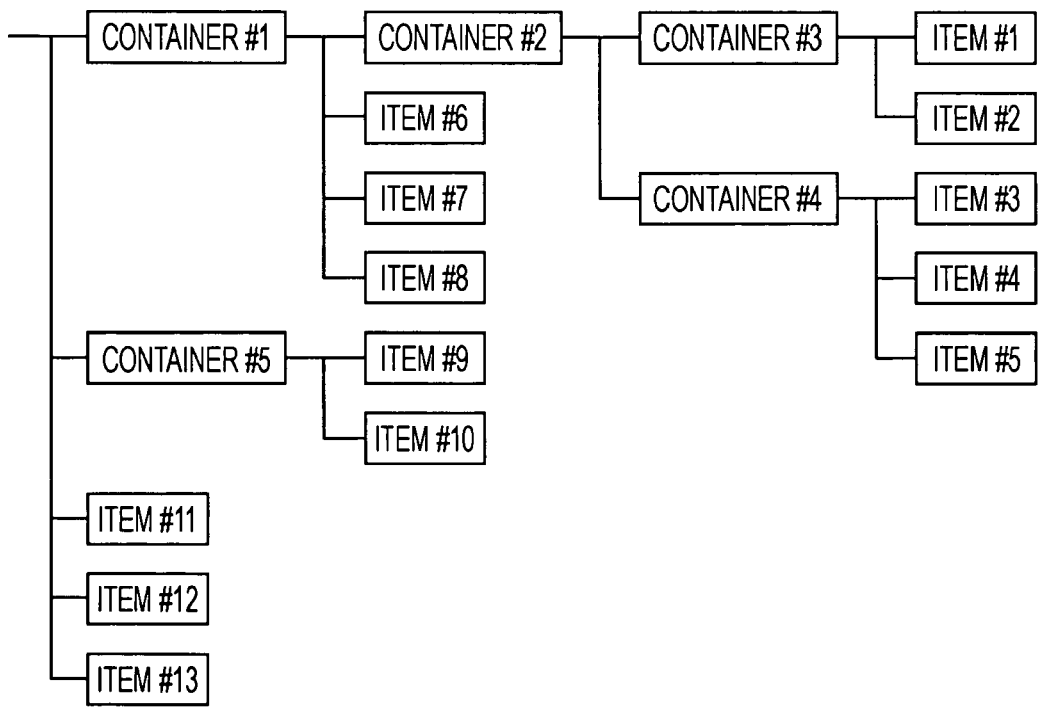
FIG. 3 illustrates an example of a manner in which contents stored in a media server are managed in the form of a tree structure.

FIG. 3 illustrates an example of a manner in which contents stored in a media server are managed in the form of a tree structure.

A media server serving as a UPnP device has a function of CDS (Contents Directory Service) which allows the media server to notify a control point what contents are stored in the media server. The CDS includes two types of abstracted objects called containers and items, corresponding to folders and files in the Window OS (Operating System) provided by Microsoft Co., Ltd. of USA. Containers and items are managed in the form of a tree structure. In the present embodiment, audio data transmitted from a media server corresponds to an item shown in FIG. 3.

The control point is capable of detecting a URL (a link address) of each content from the tree structure acquired from the media server. If the control point succeeds in acquired a desired audio content (item), the control point is capable of controlling the operation of audio tracks (audio data) including playing and stopping audio contents by using an AV transport function of the media server.

In the present embodiment, the servers 1 and 2 and the audio playback apparatuses 3 to 5 are allowed to connect to each other using the addressing function of UPnP and communicate to each other using TCP/IP. To make a connection, mutual authentication is performed between devices using the discovery function of UPnP. These functions allow the respective devices to detect the network configuration and communicate with a target electronic device.

Examples of Configurations of Server

Next, examples of configuration of electronic devices in home network system according to an embodiment of the present invention are described.

Figure 4:
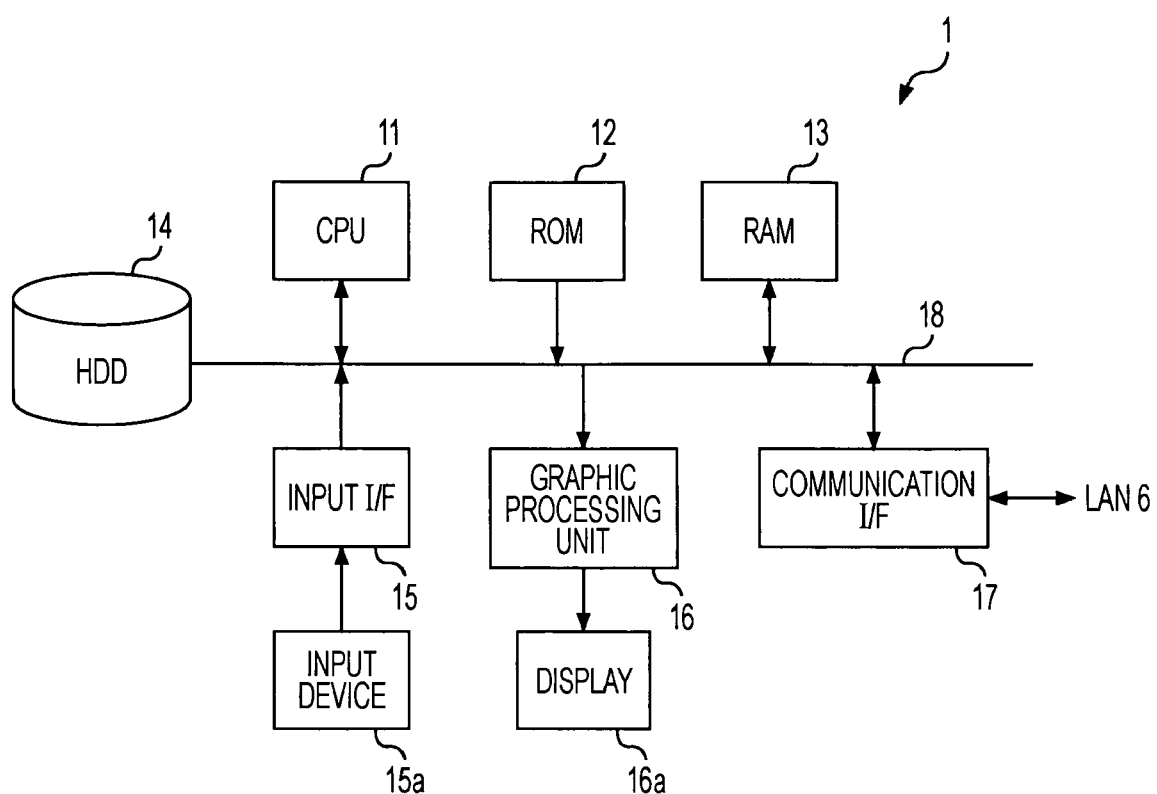
FIG. 4 is a block diagram illustrating an example of a hardware configuration of a server.

FIG. 4 is a block diagram illustrating an example of a hardware configuration of a server. In the following description, by way of example, the hardware configuration of the server 1 is explained, although the server 2 may also be configured in a similar manner.

As shown in FIG. 4, the server 1 includes a CPU (Central Processing Unit) 11, a ROM (Read Only Memory) 12, a RAM (Random Access Memory) 13, an HDD 14, an input interface (I/F) 15, a graphic processing unit 16, and a communication interface (I/F) 17, wherein these parts are connected to each other via internal bus 18.

The CPU 11 is responsible for control over the entire server 1. In the ROM 12, a program executed by the CPU 11 and associated data are stored. The RAM 13 is mainly used a work area in various processes.

The HDD 14 has a storage capacity high enough to store many digital contents (which are provided in response to a request). The HDD 14 is used to store various programs used by the CPU 11 and data used in various processes. The HDD 14 is also used as a work area in various processes such as transmission of a content transcode or a content to a device via the LAN 6.

More specifically, in the present embodiment, in the HDD 14, stored is a server program to be executed by the CPU 11 to allow the device to function as a server for transmitting audio streams to the audio playback apparatuses 3 to 5 according to the DLNA guide line. The functions of the server program may include a transcode function for conversion of the coding method, the sampling rate, the quantization rate, etc. of audio streams stored in the HDD 14.

The input interface 15 is connected to, for example, an input device 15a such as a keyboard and a mouse. The input interface 15 receives a signal output from the input device 15a and transfers the signal to the CPU 11 via the internal bus 18.

The graphic processing unit 16 is connected to, for example, a display 16a such as a LCD (Liquid Crystal Display). The graphic processing unit 16 operates, under the control of CPU 11, so as to display an image on a screen of the display 16a.

The communication interface 17 is connected to the LAN 6 via a LAN cable (not shown) and serves as an interface with other devices in transmission/reception of data.

Configuration of Audio Playback Apparatus

Figure 5:
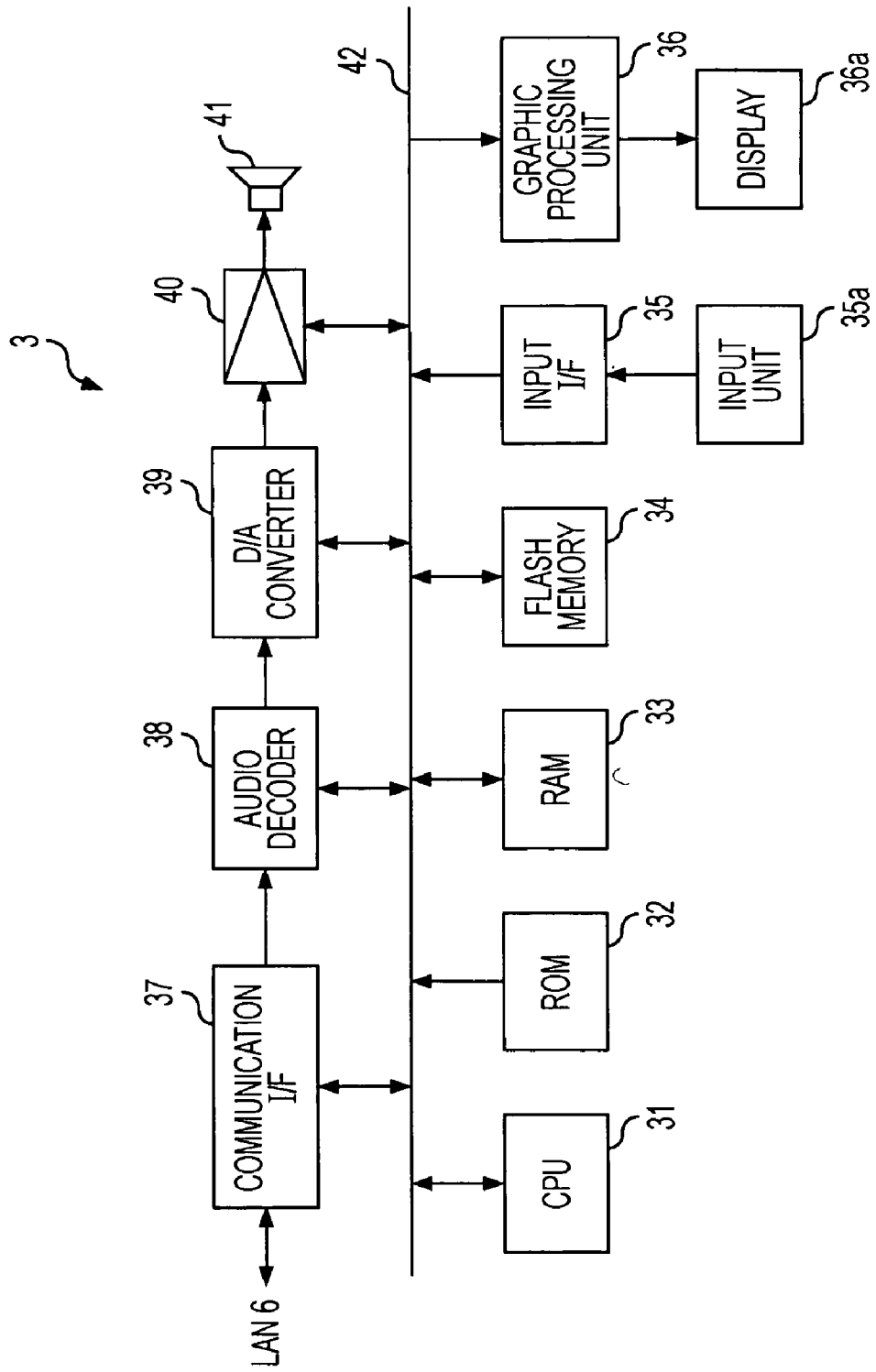
FIG. 5 is a block diagram illustrating an example of a hardware configuration of an audio playback apparatus.

FIG. 5 is a block diagram illustrating an example of a hardware configuration of an audio playback apparatus. In the following explanation, by way of example, the hardware configuration of the audio playback apparatus 3 is explained. Note that the audio playback apparatuses 4 and 5 may also be configured in a similar manner.

As shown in FIG. 5, the audio playback apparatus 3 includes a CPU 31, a ROM 32, a RAM 33, a flash memory 34, an input interface (I/F) 35, an input unit 35a, a graphic processing unit 36, a display 36a, a communication interface (I/F) 37, an audio decoder 38, a digital-to-audio converter 39, an audio amplifier 40, and a speaker 41. These parts, except for the speaker 41, are connected to each other via an internal bus 42.

The CPU 31 is responsible for control over the entire audio playback apparatus 3. In the ROM 32, stored are programs and associated data used by the CPU 31 in execution of various processes. The RAM 33 is mainly used as a work area in various processes. The CPU 31, the ROM 32 and the RAM 33 may be implemented as a whole in the form of a microcomputer. The flash memory 34 is a writable nonvolatile memory and is used to retain various data even after the power of the audio playback apparatus 3 is turned off.

The input interface 35 transfers a signal received from the input unit 35a to the CPU 31 via the internal bus 42. The input unit 35a has various input switches such as operation keys. The graphic processing unit 36 operates under the control of CPU 31 to display an image on a screen of the display 36a. The display 36a may be, for example, a LCD display.

The communication interface 37 is connected to the LAN 6 via a LAN cable (not shown) and serves as an interface with other devices in transmission/reception of data. The communication interface 37 extracts audio stream data from a packet received via the LAN 6 and directly transfers the extracted audio stream data to the audio decoder 38.

The audio decoder 38 decodes the audio stream data received from the communication interface 37. The audio decoder 38 is adapted to decode audio data in various formats such as a MP3(Moving Picture Experts Group-Audio Layer 3) format. When audio data in a LPCM (Linear Pulse Code Modulation) format is input, the audio decoder 38 directly output the input audio data to the digital-to-analog converter 39. The functions of the audio decoder 38 may be implemented by software executed by the CPU 31.

The digital-to-analog converter 39 converts the digital audio data supplied from the audio decoder 38 into an analog audio signal. The audio amplifier 40 amplifies the analog audio signal supplied from the digital-to-analog converter 39 to a predetermined level and supplies the amplified analog audio signal to the speaker 41. The speaker 41 outputs a voice/sound according to the supplied analog audio signal.

In the audio playback apparatuses 3 to 5, a plurality of audio streams can be continuously played back as described below. In the following explanation, by way of example, it is assumed that audio streams transmitted from the server 1 are received by the audio playback apparatus 3 and played back thereby. Note that the audio playback apparatus 4 and 5 can also be configured to operate in a similar manner to the audio playback apparatus 3, i.e., the audio playback apparatus 4 and 5 are capable of selecting, for example, the server 2, receiving audio streams from the server 2, and continuously playing back the audio streams.

Continuous Stream Playback Operation

Figure 6:
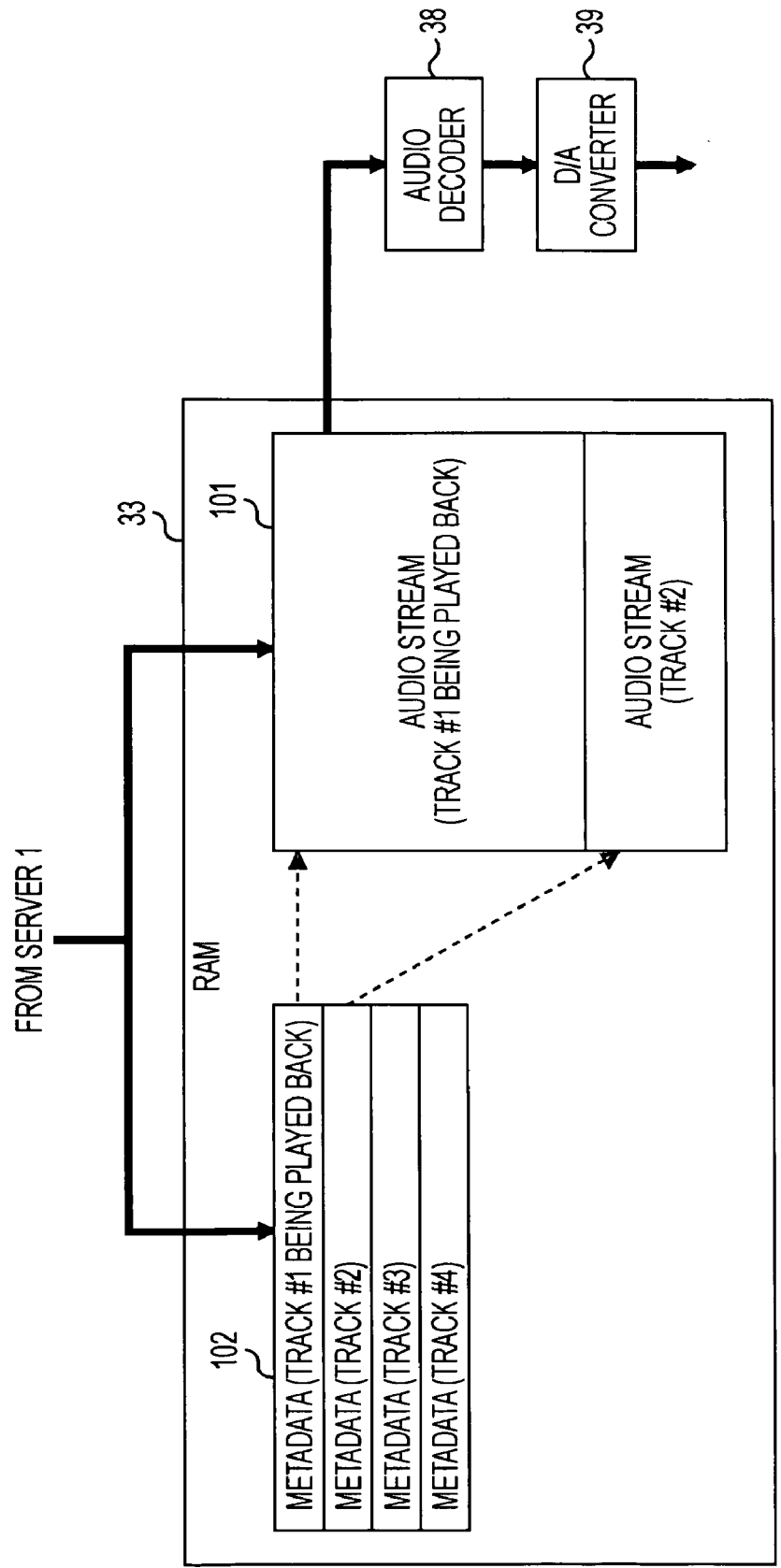
FIG. 6 is a diagram provided for explanation of a manner of controlling a buffer in an audio playback apparatus according to an embodiment of the present invention.

FIG. 6 is a diagram provided for explanation of a manner of controlling a buffer in an audio playback apparatus according to an embodiment of the present invention.

In the present embodiment, the audio playback apparatus 3 is allowed to continuously play back a plurality of audio streams by using an audio buffer 101 to temporarily store audio stream data to be played back and a meta buffer 102 to temporarily store metadata associated with the audio streams. Note that the reading/writing of data from/to the buffers and receiving of audio data/metadata are performed and controlled by executing a program by the CPU 31. In the following explanation, audio streams are audio data files corresponding to the items shown in FIG. 3.

The audio buffer 101 and the meta buffer 102 are realized in the form of FIFO (First In First Out) buffers using the RAM 33. The audio buffer 101 and the meta buffer 102 may be implemented, for example, in the form of ring buffers. In the audio buffer 101, audio stream data received from the server 1 in the audio stream playback operation is sequentially stored. The audio stream data is sequentially read from the audio buffer 101 to the audio decoder 38 and is decoded thereby and is further converted into an analog form by the digital-to-analog converter 39. As a result, a voice/sound is output in accordance with the audio stream data.

The meta buffer 102 is a buffer for storing metadata of an audio stream played back by the audio playback apparatus 3, and has a storage capacity large enough to store metadata corresponding to, for example, four audio streams. The metadata is transmitted from the server 1 in response to a request issued by the audio playback apparatus 3. The metadata includes at least location information (URL, port number, etc.) for acquiring a corresponding audio stream. The metadata may further include data associated with the audio stream such as a title, a producer name (artist name), an album name, a total playback time, and a data size, which are used to control the playback operation including the image display operation. The metadata stored in the meta buffer 102 is obtained by extracting necessary information from metadata transmitted in the form of XML data from the server 1 in response to a browse action.

The basis procedure of playing back an audio stream by the audio playback apparatus 3 is described below. First, list information indicating audio streams available from the server 1 is acquired, and a list of the audio streams is displayed on the display 36a so that a user is allowed to select an audio stream from the list. If an audio stream is selected by the user from the list, a request is sent to the server 1 to request the server 1 to transmit metadata including further detailed information about the selected audio stream. Information necessary for playback of the audio stream is extracted from the received metadata, a request for transmission of the audio stream is produced on the basis of the extracted information. The produced request is sent to the server 1. If the audio stream is transmitted from the server 1 in response to the request, the audio stream is temporarily stored in the audio buffer 101 and is then read therefrom into the audio decoder 38.

The process of continuously playing a plurality of audio streams by the audio playback apparatus 3 is described below. When playing of an audio stream is started, at least metadata associated with an audio stream to be played next is stored in the meta buffer 102. In the example shown in FIG. 6, an audio stream of a track #1 is in the playback operation, and metadata associated with an audio stream of a track #2 is stored in the meta buffer 102.

Meanwhile, the audio stream data to be played back is sequentially stored in the audio buffer 101. When the amount of data stored therein reaches a predetermined value, reading of data from the audio decoder 38 is started. The storing of data into the audio buffer 101 is controlled such that the audio buffer 101 is always filled with audio stream data without having any free space.

When all audio stream data in the playback operation has been received and a free storage space occurs in the audio buffer 101, the audio playback apparatus 3 starts reading metadata associated with the next audio stream from the meta buffer 102 without waiting for completion of the playback of the current audio stream being played back. A request for transmission of the next audio stream is produced in accordance with the location information described in the metadata, and the request is sent to the server 1. If the audio stream is received, the audio stream is sequentially stored in the free storage space of the audio buffer 101. Thereafter, the storing of the data into the audio buffer 101 is controlled such that no free storage space occurs in the audio buffer 101.

If all audio stream data being in the playback operation has been read from the audio buffer 101 into the audio decoder 38, next audio stream data is read from the audio buffer 101 and played back without a break. The metadata associated with the audio stream whose playback is completed is deleted from the meta buffer 102, and metadata associated with an audio stream to be played back next to the audio stream being currently played back is received from the server 1 and stored in the meta buffer 102.

Note that a request for transmission of metadata to be stored as new metadata into the meta buffer 102 may be sent to the server 1 in a period from the time of referring to metadata to receive a next audio stream from the server 1 to the time of the end of playback of this audio stream.

The control of the buffers in the above-described manner ensures that when playback of a previous audio stream is ended, data of a beginning part of a next audio stream has already been received and stored in the audio buffer 101 regardless of the degree of traffic congestion of the LAN 6 or the processing load imposed on the server 1, and thus a plurality of music contents can be continuously played with substantially no break between music contents.

The storage capacity of the audio buffer 101 is determined so as to achieve the above-described operation, taking into account the traffic congestion on the LAN 6 and the processing load imposed on the server 1. For example, the storage capacity of the audio buffer 101 is determined such that a maximum time is predicted which is needed to start storing an audio stream received from the server 1 into the audio buffer 101 after a request for a next audio stream corresponding to metadata is issued, and the storage capacity is set to be capable of storing a greater amount of data than the amount of audio stream data read from the audio buffer 101 during the predicted maximum time.

The meta buffer 102 needs to store at least metadata associated with an audio stream to be played next. However, preferably, metadata of a plurality of audio streams is stored in the meta buffer 102 as shown in FIG. 6 to ensure that even if a delay occurs in arrival of metadata due to traffic congestion of the LAN 6 or due to an increase in processing load imposed on the server 1, continuous playback is allowed, although the playback is limited to tracks corresponding to metadata stored in the meta buffer 102.

In a case where metadata indicates that a next audio stream is the same in specifications such as coding format, sampling frequency, bit rate, etc., as a previous audio stream, it is possible to start decoding of the next audio stream without initializing the audio decoder 38 and other circuits whereby it is possible to switch the audio streams without creating a silent pause, that is, it is possible to achieve gapless playback.

In the example shown in FIG. 6, the metadata associated with the audio stream being in the playback operation is kept in the meta buffer 102 until the playback of the current audio stream is ended so that the metadata can be referred to by the playback controller or the like as required. Alternatively, when an audio stream is acquired from the server 1, metadata necessary for acquisition of the audio stream may be read from the meta buffer 102 and stored into another memory area, and, at this stage of the process, metadata associated with an audio stream to be played next may be stored into the meta buffer 102.

Continuous Stream Playback Operation (According to Another Embodiment)

Figure 7:
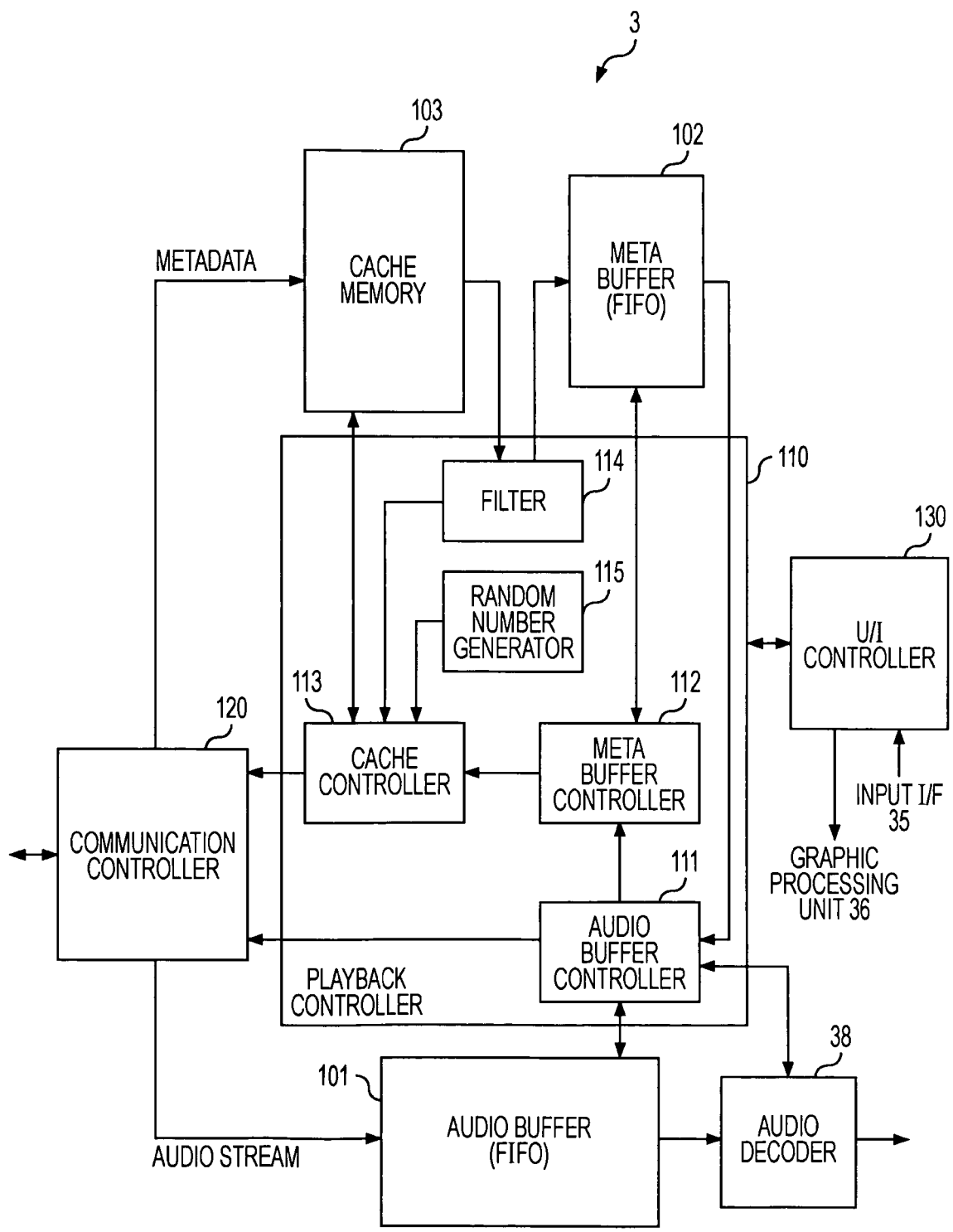
FIG. 7 is a functional block diagram of an audio playback apparatus according to an embodiment of the present invention.

FIG. 7 is a functional block diagram of an audio playback apparatus according to an embodiment of the present invention.

The audio playback apparatus 3 according to the present embodiment includes a cache memory 103 for caching metadata, in addition to the audio buffer 101 and the meta buffer 102 described above in the first embodiment. The provision of the cache memory 103 makes it possible to further ensure that a plurality of audio streams are played back continuously without a break. Use of the cache memory 103 also makes it possible to more easily handle a random playback operation. The cache memory 103 may also be implemented by the RAM 33 or the like.

In the present embodiment, the audio playback apparatus 3 includes, as shown in FIG. 7, a playback controller 110, a communication controller 120, and a user interface (U/I) controller 130, whereby the continuous playback operation of a plurality of audio streams is controlled. The functions of these parts are realized by executing a program on the CPU 31.

The playback controller 110 is responsible for general control of the playback operation of audio streams. The playback controller 110 controls the operation in accordance with a command/data input by a user via the user interface controller 130. The playback controller 110 includes an audio buffer controller 111, a meta buffer controller 112, a cache controller 113, a filter 114, and a random number generator 115.

The audio buffer controller 111 controls reading of audio stream data into the audio buffer 101 and reading of data audio buffer 101 into the audio decoder 38 into in response to a request issued by the audio decoder 38. The audio buffer controller 111 manages the free storage space in the audio buffer 101 such that when a free storage space occurs, the audio buffer controller 111 accesses the meta buffer 102 to refer to metadata associated with an audio stream to be played back next and supplies the location information described in the metadata to the communication controller 120 to issue a request for transmission of the audio stream to be played back next.

The meta buffer controller 112 controls reading of metadata into/from the meta buffer 102. If playback (decoding) of one audio stream is completed, the audio buffer controller 111 sends a message to the meta buffer controller 112 to notify the playback (decoding) of one audio stream is completed. In response to the message, the meta buffer controller 112 requests the cache controller 113 to read next metadata and supply it to the meta buffer 102.

The cache controller 113 controls reading of metadata into the cache memory 103 and reading of metadata from the cache memory 103 into the meta buffer 102. In accordance with a request issued by the meta buffer controller 112, the cache controller 113 reads metadata from the cache memory 103 into the meta buffer 102 via the filter 114. The cache controller 113 controls the status of the cache memory 103 such that when all metadata is read out, the cache controller 113 requests the communication controller 120 to issue a request for transmission of metadata of an audio stream to be played back next.

The filter 114 determines whether the metadata read from the cache memory 103 is metadata associated with the audio stream. If so, the filter 114 outputs the metadata to the meta buffer 102. However, if not so, the filter 114 notifies the cache controller 113 that the metadata read from the cache memory 103 does not correspond to the audio stream.

The random number generator 115 is a block adapted to determine a random order in which to play back music contents (in a random (shuffle) playback mode), and has a unit adapted to generate a random number indicating a track number to be played back.

The communication controller 120 is a block adapted to control communication via the LAN 6. More specifically, in response to a request issued by the playback controller 110, the communication controller 120 performs the communication procedure defined in the UPnP. The communication controller 120 stores the metadata received via the communication procedure into the cache memory 103 and stores the received audio stream data into the audio buffer 101.

The user interface controller 130 detects, via the input I/F 35, an input operation performed on the input unit 35a by a user, and supplies input operation information corresponding to the performed input operation to the playback controller 110. In accordance with control information supplied from the playback controller 110, the user interface controller 130 generates display information depending on a situation such as a situation in which a server or a content is to be selected or a situation in which a content is being played, and the user interface controller 130 supplies the generated display information to the graphic processing unit 36. The graphic processing unit 36 displays an image on the display 36a in accordance with the supplied display information.

Figure 8A:
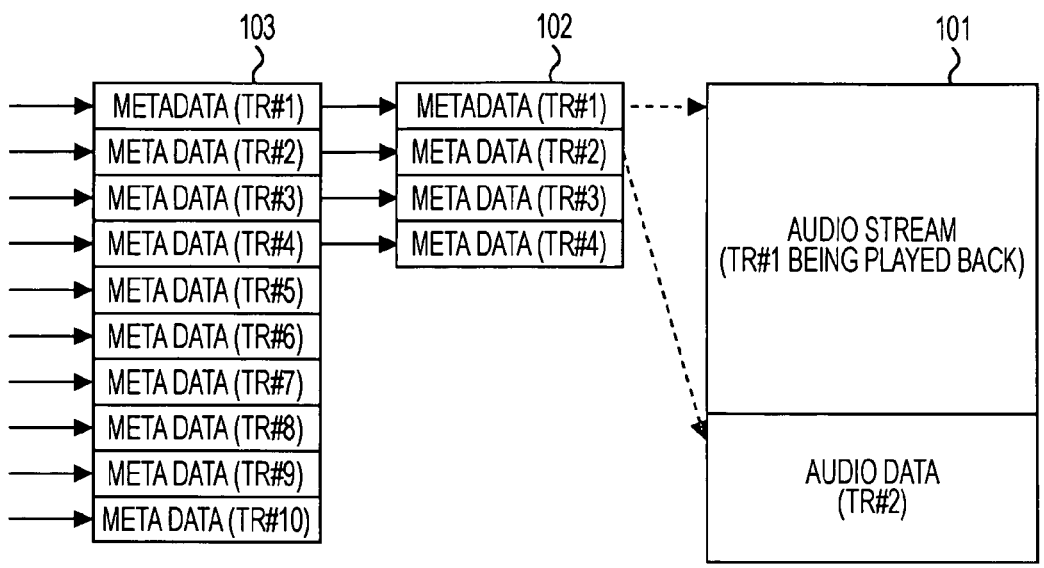
FIG. 8 is a diagram provided for explanation of a manner of controlling a buffer in an audio playback apparatus according to an embodiment of the present invention.
Figure 8B:
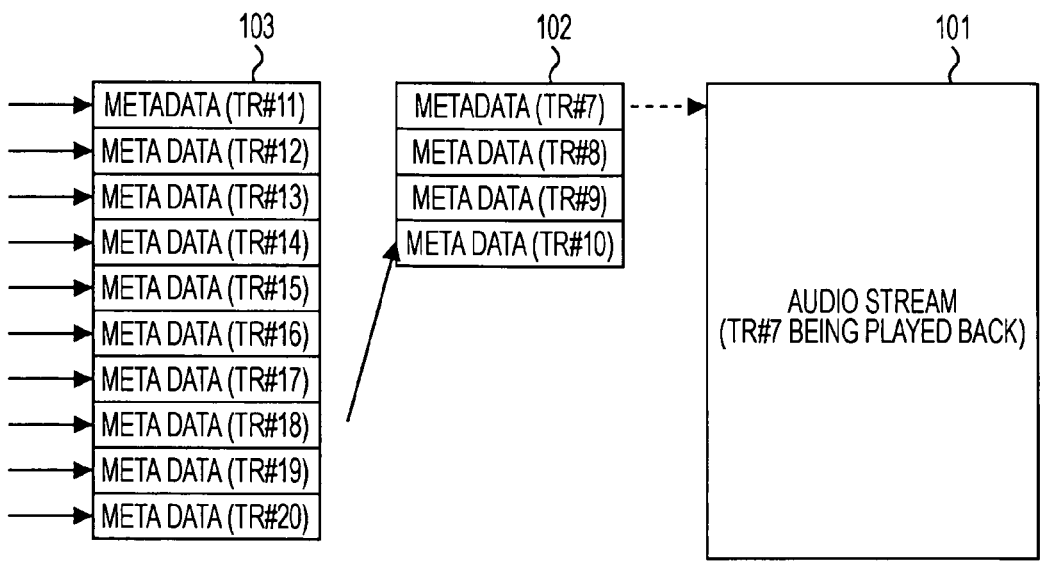

FIGS. 8A and 8B illustrate manners of controlling buffers in the audio playback apparatus according to the present embodiment of the invention.

In the example shown in FIGS. 8A and 8B, reading/storing of data from/into the cache memory 103, the meta buffer 102, and the audio buffer 101 is controlled so as to continuously play back audio streams in the order track #1 to track #20. Note that in this example, it is assumed that the cache memory 103 has a storage capacity capable of storing metadata of 10 tracks, and the meta buffer 102 has a storage capacity capable of storing metadata of 4 tracks.

If a command to start playing a track #1 is issued by a user, then metadata of 10 tracks starting with the track #1 are stored in the cache memory 103 as shown in FIG. 8A. These metadata may be received from the server 1 when the playback start command is issued or may be received beforehand.

Metadata of first 4 tracks of the 10 tracks are then read into the meta buffer 102. In accordance with location information described in the metadata of the track #1, a corresponding audio stream is received and stored in the audio buffer 101. Playback of the audio stream is then started.

As with the previous embodiment, when all audio stream data of the track #1 has been received, and a free storage space occurs in the audio buffer 101, the meta buffer 102 is accessed to refer to the metadata of the track #2 to be played next, and receiving of the audio stream of the track #2 is started in accordance with the metadata and the received audio stream is stored in the audio buffer 101.

When the playback of the audio stream of the track #1 is completed, the metadata associated with the track #1 is deleted from the meta buffer 102, and the metadata associated with the next track #5 is read from the cache memory 103 in the free storage space of the meta buffer 102. Alternatively, when the metadata of the track #1 is read from the meta buffer 102 to start playing the track #1, or when the receiving of the audio stream of the next track #2 is started, the metadata of the track #1 may be deleted from the meta buffer 102 and the metadata of the track #5 may be stored.

Thereafter, the above-described process is performed repeatedly. Finally, if the metadata of the last track #10 is read into the meta buffer 102, then, as shown in FIG. 8B, the playback of the audio stream of the track #7 is started. In this state, the metadata of the tracks #7 to #10 remain in the meta buffer 102. If the cache controller 113 detects that all metadata have been read from the cache memory 103 into the meta buffer 102, the cache controller 113 controls the communication controller 120 to send a request for transmission of metadata of next 10 tracks to the server 1. If metadata of next 10 tracks (tracks #11 to #20) are received, the cache memory 103 is overwritten by the received metadata, and the metadata are sequentially read starting from the first part thereof from the cache memory 103 into the meta buffer 102 in a similar manner as described above.

As described above, in the present embodiment, the cache memory 103 capable of storing a greater number of tracks than the meta buffer 102 can store is used as a cache via which to supply metadata to the meta buffer 102 thereby ensuring that a metadata of an audio stream to be played can be acquired without a delay, and thus continuous playback is achieved. For example, even in a case where a plurality of audio streams each having a short length are played, and thus metadata stored in the meta buffer 102 are updated frequently in a short time, it is possible to read metadata from the cache memory 103 without having to receive the metadata from the server 1 and continuously play corresponding audio streams.

Depending on the tree structure of contents managed by the server 1, there is a possibility that metadata received from the server 1 include metadata which is not associated with any audio stream to be played. For example, there is a possibility that items of an audio stream and a video stream exist in lower layers of the same container, and there is also a possibility that there is a further container together with items.

In such a case, metadata associated with objects in lower layers of the same container are received regardless of the types of objects in the order defined by the server 1 and the received metadata are stored in the cache memory 103. When metadata of an object is read from the cache memory 103, the filter 114 determines whether this metadata is associated with an audio stream. If the metadata is associated with an audio stream, the metadata is directly transferred to the meta buffer 102, but otherwise the filter 114 sends an error message to the cache controller 113. In response to receiving the error message, the cache controller 113 read metadata corresponding to a next object from the cache memory 103.

Thus, only metadata associated with audio streams are stored in the meta buffer 102. This make it is possible to continuously audio streams simply by sequentially reading metadata from the meta buffer 102 under the control of the audio buffer controller 111. That is, at a time at which to receive an audio stream data to be played next, it is not necessary to determine whether metadata stored in the meta buffer 102 is that corresponding to the audio stream, but it is allowed to simply read metadata from the meta buffer 102 to continuously play back audio streams without creating a silent period between audio streams.

Next, processes performed by respective parts in the audio playback apparatus 3 in the playback of audio streams in the continuous playback mode are described below. FIG. 9 is a flow chart illustrating a process performed by the audio playback apparatus to start a playback operation in the continuous playback mode.

In step S11, if the audio playback apparatus 3 is connected to the LAN 6, a server search process is started. More specifically, if the audio playback apparatus 3 is connected to the LAN 6, the communication controller 120 acquires the network address thereof, and the playback controller 110 requests the communication controller 120 to search for servers. In response, the communication controller 120 multicasts a search message over the LAN 6 according to the UPnP standard. In response to the search message, the servers 1 and 2 on the LAN 6 return IDs identifying servers 1 and 2 and URLs for acquiring device descriptions.

The communication controller 120 supplies information associated with the servers 1 and 2 detected in the above process to the playback controller 110. The playback controller 110 sends a command to the user interface controller 130 to display a screen for use by a user to select the server 1 or 2.

In accordance with the command, the user interface controller 130 displays a list of names of the like of the detected servers 1 and 2 on the display 36*a*. In this state, the process waits until a user performs a selection operation.

In step S12, in accordance with an input operation performed by the user to select a server, audio playback apparatus 3 acquires information about contents available from the server (by way of example, the server 1) selected by the user.

If the playback controller 110 detects via the user interface controller 130 that the server 1 has been selected, the playback controller 110 requests the communication controller 120 to acquire a device description from the server 1. The communication controller 120 accesses a specified URL to acquire a device description by using a GET command. The communication controller 120 detects a root location of a hierarchical structure in which contents are managed by the server 1, and the communication controller 120 requests for information about lower layers under the root layer.

If the information returned as a response to the request indicates that lower layers include only containers, information about these containers is supplied to the playback controller 110. The playback controller 110 requests the user interface controller 130 to display a list of containers on the screen to allow a user to select a container. In response to the request, the user interface controller 130 displays a list of name assigned to the respective containers on the display 36*a*. If the user selects a container from the list, the playback controller 110 requests the communication controller 120 to acquire attribute information of a lower layer of the selected container.

By performing the above-described process repeatedly, information about lower layers is obtained. In general, in a directly lower layer below the root layer, containers are separately provided for respective artists, and in a further lower layer, containers are separately provided for respective albums. In a still further lower layer, items are provided for respective music contents. Note that the audio playback apparatus 3 is allowed to specify an artist or the like as a search key and search for items stored in a hierarchical structure, such as that described above, in accordance with the specified search key.

If an item is detected in a lower layer via the above-described process, metadata indicating an outline of the detected item is acquired in the form of XML data. In the present embodiment, as described above, each item corresponds to stream data of a content (a music content, in the present embodiment), and thus, in most cases, the acquired metadata indicates list information associated with items included in a lower layer of a container corresponding to an album.

In step S13, the list information about items acquired from the server 1 is transferred from the communication controller 120 to the playback controller 110. In accordance with the supplied list information, the playback controller 110 requests the user interface controller 130 to display a list of titles, artist names, etc. of available music contents as a selection screen. In accordance with the request, the user interface controller 130 displays the list of music contents on the display 36*a*. In this state, the audio playback apparatus 3 waits until a user selects a music content to be played first.

In step S14, if the playback controller 110 receives music content selection information from the user interface controller 130, the playback controller 110 requests the communication controller 120 to acquire metadata including further detailed information about the selected music. Note that in the above request, supply of metadata of 10 tracks starting from the track of the selected music content is requested. In the example shown in FIG. 8, if the track #1 is selected, a request for metadata of tracks #1 to #10 is issued. The communication controller 120 makes an action to request the server 1 to transmit metadata of specified track numbers.

The metadata received from the server 1 is stored in the cache memory 103 via the communication controller 120. The cache controller 113 supplies metadata associated with first four tracks stored in the cache memory 103 to the meta buffer 102 via the filter 114.

In step S15, the audio buffer controller 111 reads metadata of one track from the meta buffer 102. The audio buffer controller 111 supplies location information described in the metadata to the communication controller 120 and requests the communication controller 120 to acquire an audio data at a location indicated by the location information. The communication controller 120 access the server 1 in accordance with the supplied location information and requests the server 1 to transmit the corresponding audio stream.

In step S16, if the audio playback apparatus 3 receives the audio stream transmitted from the server 1, the received audio stream is sequentially supplied to the audio buffer 101 via the communication controller 120. The audio data is then sequentially read from the audio buffer 101 and supplied to the audio decoder 38. Thus, the audio data is played back.

Figure 10:
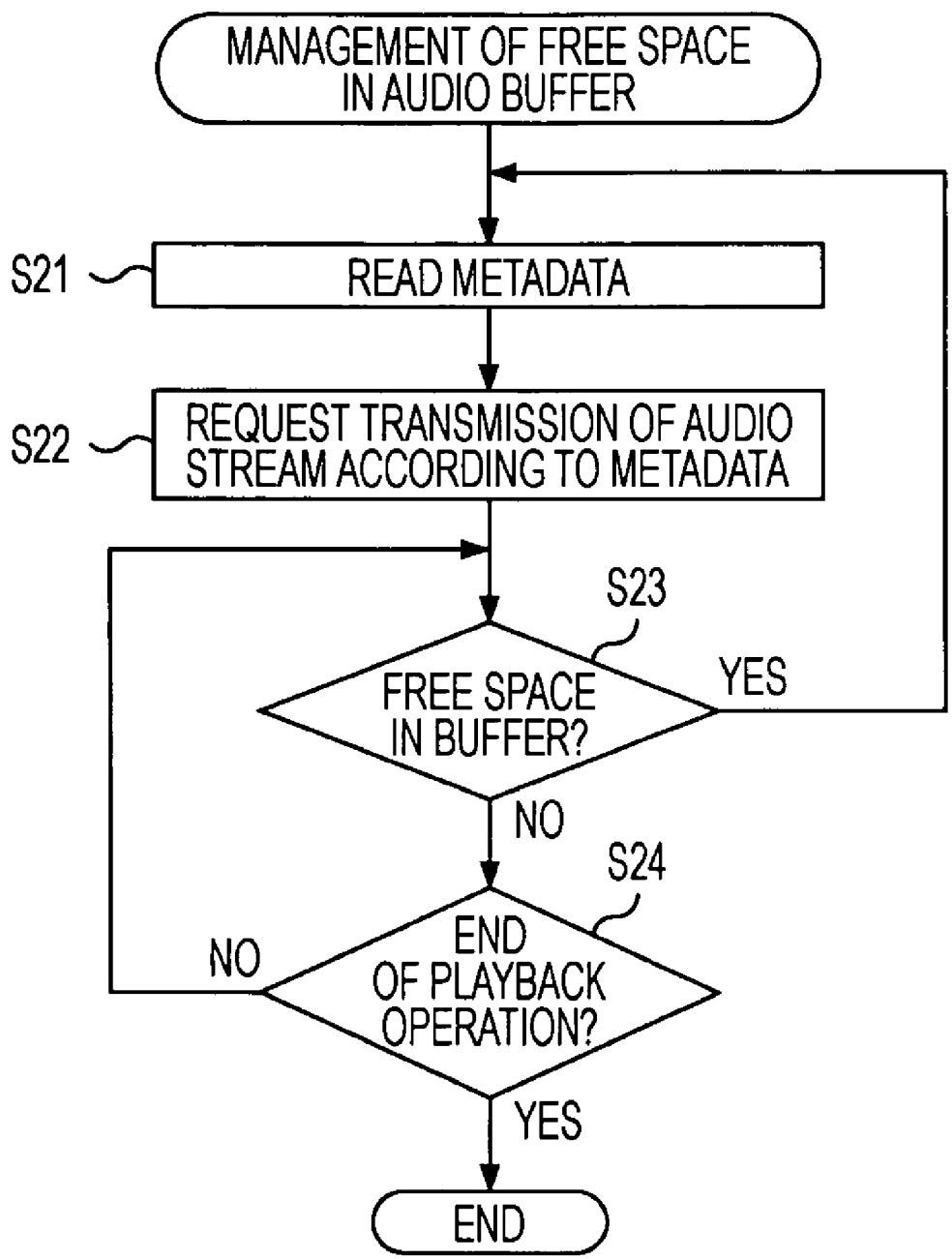
FIG. 10 is a flow chart illustrating a process performed by an audio buffer controller to manage a free storage space of an audio buffer in a continuous playback mode.

FIG. 10 is a flow chart illustrating a process performed by the audio buffer controller to manage a free storage space of the audio buffer in the continuous playback operation.

As described above, if audio stream data has been stored in the audio buffer 101, the audio buffer controller 111 controls the audio buffer 101 such that data is sequentially read from the audio buffer 101 to the audio decoder 38 in accordance with a request issued by the audio decoder 38. In this process, the audio buffer controller 111 controls the reading of data into the audio buffer 101 as follows.

In step S21, the audio buffer controller 111 reads metadata of one track from the meta buffer 102.

In step S22, the audio buffer controller 111 supplies location information described in the metadata to the communication controller 120 and requests the communication controller 120 to transmit a corresponding audio stream. In response to the request, the communication controller 120 makes an action to transmit the requested audio stream. In response, the server 1 starts transmission of the audio stream. The transmitted audio stream data is sequentially stored in the audio buffer 101.

In step S23, the audio buffer controller 111 monitors the state of the audio buffer 101 in terms of the free storage space. If there is no free storage space, the processing flow proceeds to step S24. On the other hand, if a free storage space occurs in the audio buffer 101 after one audio stream has been completely received, the processing flow returns to step S21 to read metadata of a next track from the meta buffer 102. In this case, an audio stream to be played next is transmitted from the server 1.

In step S24, the audio buffer controller 111 determines whether a user has issued a command to end the continuous playback operation. If it is determined that the command is not issued, the processing flow returns to step S23. In step S23, the state of the audio buffer 101 in terms of the free storage space is checked. On the other hand, if it is determined in step S24 that the playback operation end command has been issued, the operation is ended.

Via the process described above, the audio buffer 101 is controlled such that as much audio stream data as the full storage capacity is always stored in the audio buffer 101. When reception of one audio stream is completed, reception of a next audio stream is automatically started without waiting for completion of playback of the current audio stream.

Figure 11:
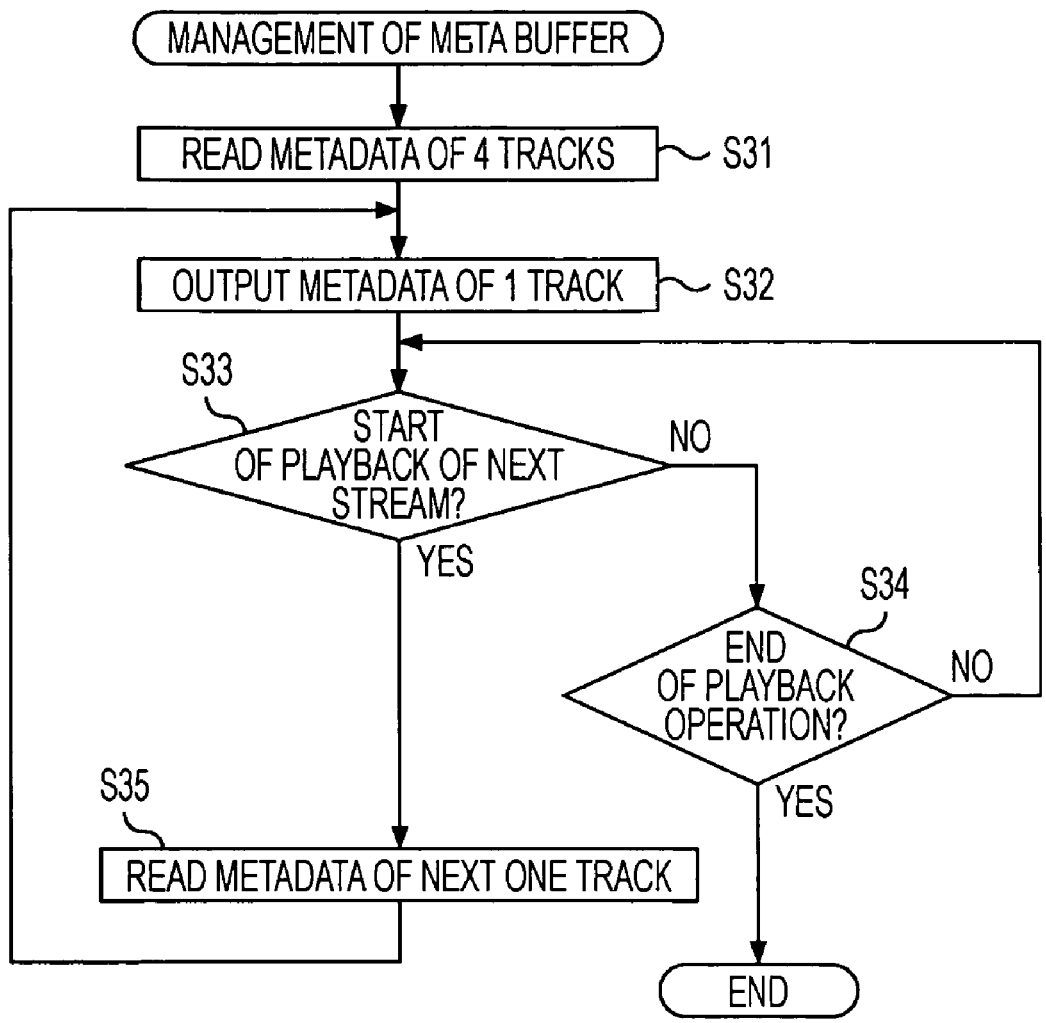
FIG. 11 is a flow chart illustrating a process performed by a meta buffer controller to manage a meta buffer.

FIG. 11 is a flow chart illustrating a process performed by the meta buffer controller to manage the meta buffer.

In step S31, if the continuous playback operation is started, the meta buffer controller 112 requests the cache controller 113 to read metadata of four tracks. In response to the request, metadata of four tracks is read from the cache memory 103 and stored to the meta buffer 102 via the filter 114.

In step S32, in response to a request from the audio buffer controller 111, the meta buffer controller 112 reads metadata of a track to be played first from the meta buffer 102 and supplies it to the audio buffer controller 111.

In step S33, the meta buffer controller 112 determines whether playback of one audio stream is completed and playback of a next audio stream has been started. If so, the processing flow proceeds to step S35, but otherwise the processing flow proceeds to step S34.

The determination as to whether playback of a next audio stream has been started can be made by determining whether decoding of the new audio stream has been started by the audio decoder 38 or by determining whether reading the new audio stream from the audio buffer 101 has been started on the basis of the notification from the audio buffer controller 111.

In step S34, the meta buffer controller 112 determines whether a user has issued a command to end the continuous playback operation. If it is determined that the playback operation end command has not been issued, the processing flow returns to step S33 to make the determination as to whether playback of a next audio stream has been started. On the other hand, if it is determined that the playback operation end command has been issued, the playback operation is ended.

In step S35, the meta buffer controller 112 request the cache controller 113 to read metadata of next one track. In response to the request, metadata of the next one track is read from the cache memory 103 and transferred to the meta buffer 102 via the filter 114. The meta buffer controller 112 stores the received metadata in the storage area meta buffer 102 such that the metadata output in step S32 is overwritten.

In the process described above, when playback of the next audio stream is started, metadata data of the next one track is read into the meta buffer 102 This ensures that metadata of the audio stream being currently played back is stored in the meta buffer 102 over the entire period in which the current audio stream is being played back so that the metadata can be referred to by various parts of the apparatus. Alternatively, when metadata of one track is output in step S32 from the meta buffer 102, metadata of a next one track may be read immediately.

Figure 12:
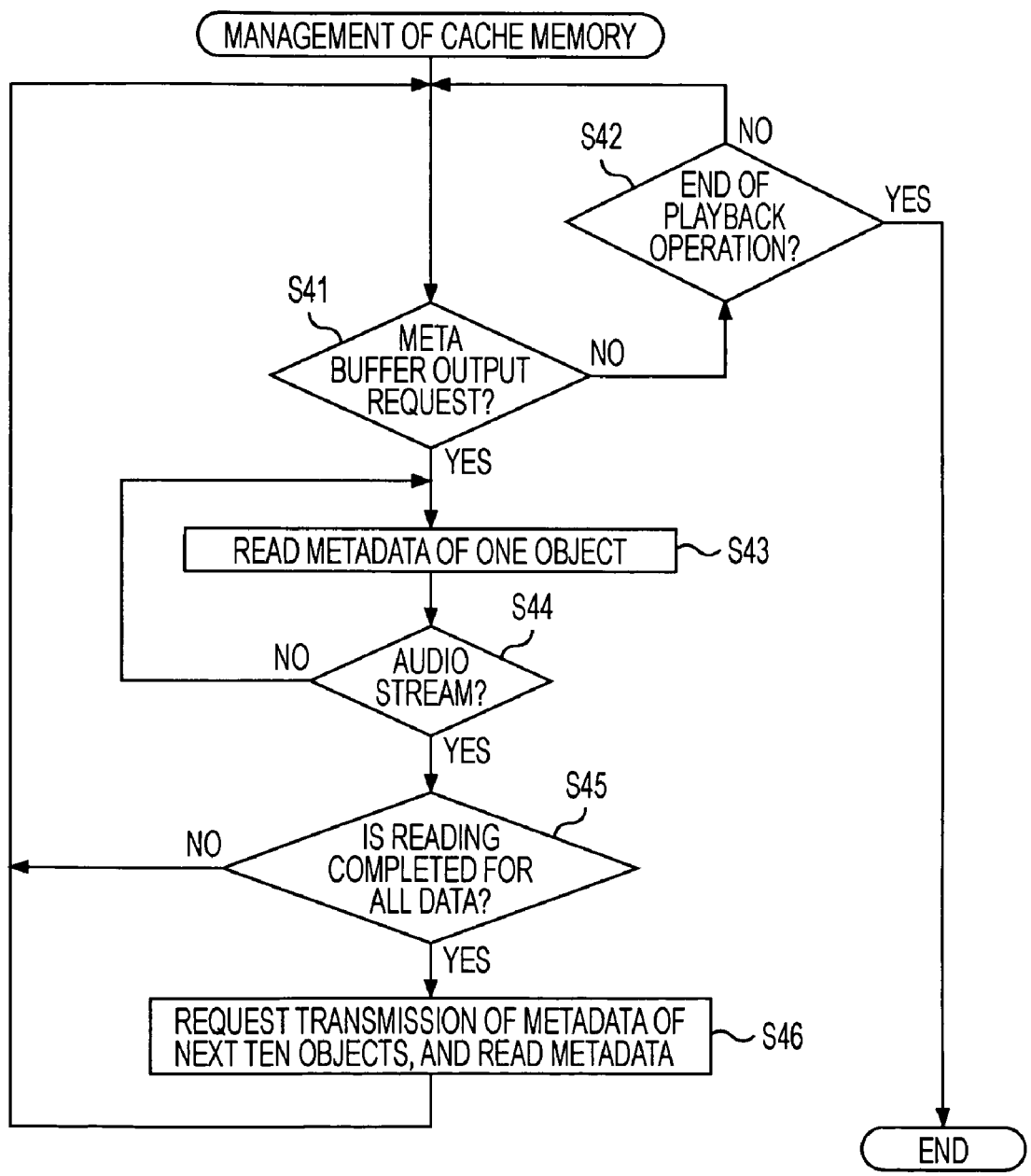
FIG. 12 is a flow chart illustrating a process performed by a cache controller to manage a cache memory.

FIG. 12 is a flow chart illustrating the process performed by the cache controller to manage the cache memory.

If, in step S14 shown in FIG. 9, metadata of the predetermined number of tracks (10 tracks, in the present embodiment) has been received from the server 1 and stored in the cache memory 103, then the cache controller 113 controls the reading/storing of data from/into the cache memory 103 as follows.

In step S41, the cache controller 113 determines whether a request for outputting of metadata of one track has been issued by the meta buffer controller 112. If so, the processing flow proceeds to step S43, but otherwise the processing flow proceeds to step S42.

In step S42, the cache controller 113 determines whether a user has issued a command to end the continuous playback operation. If it is determined that the command is not issued, the processing flow returns to step S41 to repeat the determination as to whether the request for outputting data to the meta buffer 102 has been issued. On the other hand, if it is determined in step S42 that the playback operation end command has been issued, the operation is ended.

In step S43, the cache controller 113 reads metadata of a next object immediately following an already-read object, to the filter 114 from the cache memory 103.

In step S44, the filter 114 determines whether the read metadata is associated with an audio stream. If so the metadata is directly transferred to the meta buffer 102, but otherwise a message is sent to the cache controller 113 to notify that the metadata is not associated with an audio stream.

In a case where the cache controller 113 receives the message from the filter 114, the processing flow returns to step S43 to read metadata of a further next object from the cache memory 103. On the other hand, in a case where the message is not received, the process proceeds to step S45.

Note that, although not shown in FIG. 12, in a state immediately after the continuous playback operation is started, the meta buffer controller 112 issues, in step S31 in FIG. 11, a request for metadata of four tracks. Therefore, in steps S43 and S44 performed immediately after the continuous playback operation is started, metadata of first four tracks is read.

In the case where the read metadata is associated with an audio stream, the filter 114 may analyze the metadata to detect the encoding method, the sampling frequency, and the bit rate of the audio stream and may determine whether the audio stream is of a type which can be played back by the audio playback apparatus 3. In this case, only when it is determined that the audio stream is of a type which can be played back, the metadata is transferred to the meta buffer 102, but otherwise a message is sent to the cache controller 113 to notify that the audio stream is of a type which can not be played back, and next metadata is acquired from the cache memory 103.

In step S45, the cache controller 113 determines whether all metadata stored in the cache memory 103 has been read out. In a case where there is metadata which has not yet been read out, the process returns to step S41 in which the process waits until a request to read next metadata is issued In a case where all metadata has already been read out, the process proceeds to step S46.

In step S46, on the basis of the list information acquired in step S12 in FIG. 9 and information indicating track numbers of tracks already transferred to the meta buffer 102, the cache controller 113 sends information specifying next ten objects to the communication controller 120 and requests the communication controller 120 to transmit metadata of these ten objects. In response to the request, the communication controller 120 makes an action to transmit the requested metadata. In response, the server 1 transmits metadata of the specified ten objects. The received metadata is stored in the cache memory 103 in an overwriting manner. Thereafter, the process in step S41 is performed again.

As a result of the above-described process performed by the audio buffer controller 111, the meta buffer controller 112, and the cache controller 113, it is ensured that the audio buffer 101 is always filled with audio stream data, and when reception of one audio stream is completed, next audio stream data is stored in the audio buffer 101 without a break. Thus, it is ensured that audio streams are continuously played back without having a silent period between audio streams regardless of the traffic condition of the LAN 6 or the processing load imposed on the server 1.

Figure 13:
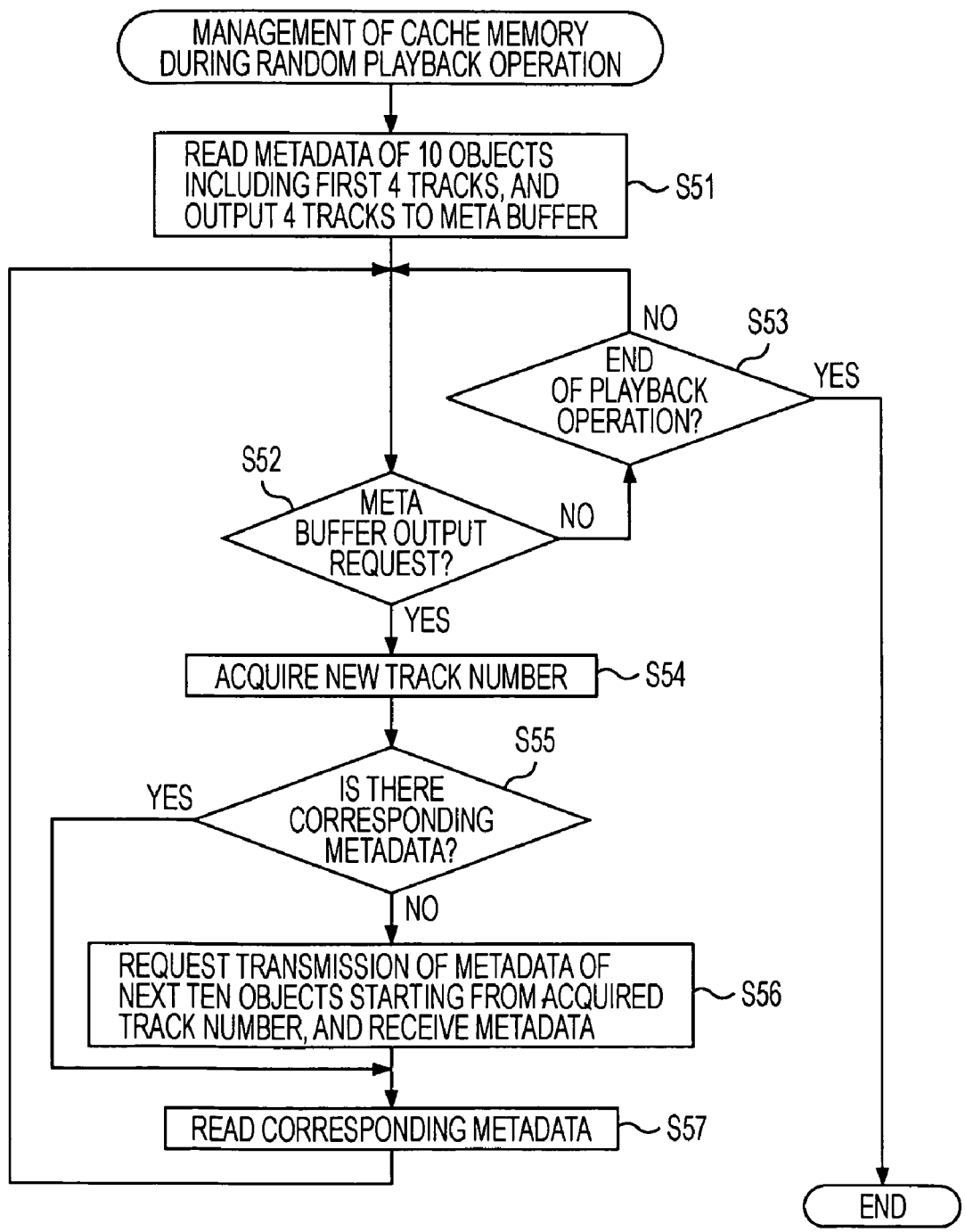
FIG. 13 is a flow chart illustrating a process of managing a cache memory in a random playback mode.

Next, the playback operation of the audio playback apparatus 3 in a random playback mode is explained. FIG. 13 is a flow chart illustrating the process of managing the cache memory in the random playback mode.

In the audio playback apparatus 3, after steps S11 and S12 shown in FIG. 9 are performed to acquire list information associated with items existing in a lower layer of a container, if a random playback mode is selected, audio streams in this lower layer of the container are randomly selected and played back. More specifically, in the random playback mode, the random number generator 115 randomly specifies track numbers from those corresponding to the items in the container described in the acquired list information.

In step S51, at the beginning of the random playback operation, at least first four track numbers are randomly selected by the random number generator 115, and metadata of the selected tracks is received from the server 1 and stored in the meta buffer 102 via the cache memory 103. In this state, the cache memory 103 is filled with metadata of ten tracks including first four tracks.

Most simply, this state can be achieved as follows. First, the random number generator 115 generates first ten track numbers. The cache controller 113 sends information indicating the generated ten track numbers to the communication controller 120. The communication controller 120 requests the server 1 to transmit metadata corresponding to these ten track numbers. The received metadata is stored in the cache memory 103, and the stored metadata is read in the playback order from the cache memory 103 to the meta buffer 102. In the above process, the metadata is read in the playback order into the meta buffer 102 until all data stored in the cache memory 103 is read. If all data stored in the cache memory 103 is read out, the process proceeds to next step S52.

In step S52, the cache controller 113 determines whether a request for outputting of metadata of one track is received from the meta buffer controller 112. If so, the processing flow proceeds to step S54, but otherwise the processing flow proceeds to step S53.

In step S53, the cache controller 113 determines whether a user has issued a command to end the random playback operation. In a case where it is determined that the playback operation end command is not issued, the processing flow returns to step S52 to determine whether a request for outputting of data to the meta buffer 102 has been issued. If it is determined that the playback operation end command is issued, the operation is ended.

In step S54, the cache controller 113 acquires a new track number from the random number generator 115.

In step S55, the cache controller 113 determines whether metadata corresponding to the acquired track number is stored in the cache memory 103. If it is determined that the metadata corresponding to the acquired track number is stored in the cache memory 103, the process proceeds to step S57, but otherwise the process proceeds to step S56.

In step S56, the cache controller 113 commands the communication controller 120 to receive metadata of 10 objects (10 tracks in the present embodiment) starting with the track number acquired in step S54. The communication controller 120 makes an action to request the server 1 to transmit the specified metadata. If the metadata is received, the received metadata is stored in the cache memory 103 in the overwriting manner.

In step S57, the cache controller 113 transfers the metadata corresponding to the track number acquired in step S54 from the cache memory 103 to the meta buffer 102.

In the process described above, even when a container includes, in its lower layer, a greater number of tracks of audio stream data than can be stored in the cache memory 103, it is possible to determine a random playback order for all these audio streams.

After new track numbers are randomly generated, only when metadata data corresponding to the track numbers do not exist in the cache memory 103, a request for transmission of the metadata is sent to the server 1. This allows a reduction in the number of times a request for metadata is sent. The generation of new track numbers is performed not immediately before the start of the playback of corresponding audio streams but at a time, far ahead thereof, at which new metadata is stored in the meta buffer 102. Therefore, the meta buffer 102 is always filled with metadata of latest four tracks. This allows the audio buffer controller 111 to directly refer to the metadata stored in the meta buffer 102, and thus allows audio streams to be continuously played without a silent period even in the random playback mode.

In FIG. 13, for simplicity, only metadata associated with audio streams are stored in the cache memory 103. Alternatively, as described above with reference to FIG. 12, only metadata associated with audio streams may be extracted by the filter 114 and supplied to the meta buffer 102. In this case, when metadata is transferred from the cache memory 103 to the meta buffer 102, if the filter 114 determines that the metadata is not associated with an audio stream or is associated with an audio stream which is not playable, the random number generator 115 generates a new number, and the process proceeds to step 56 to receive metadata of next 10 objects starting with the generated number.

Continuous Playback Operation of Streams
(According to Another Embodiment)

Figure 14:
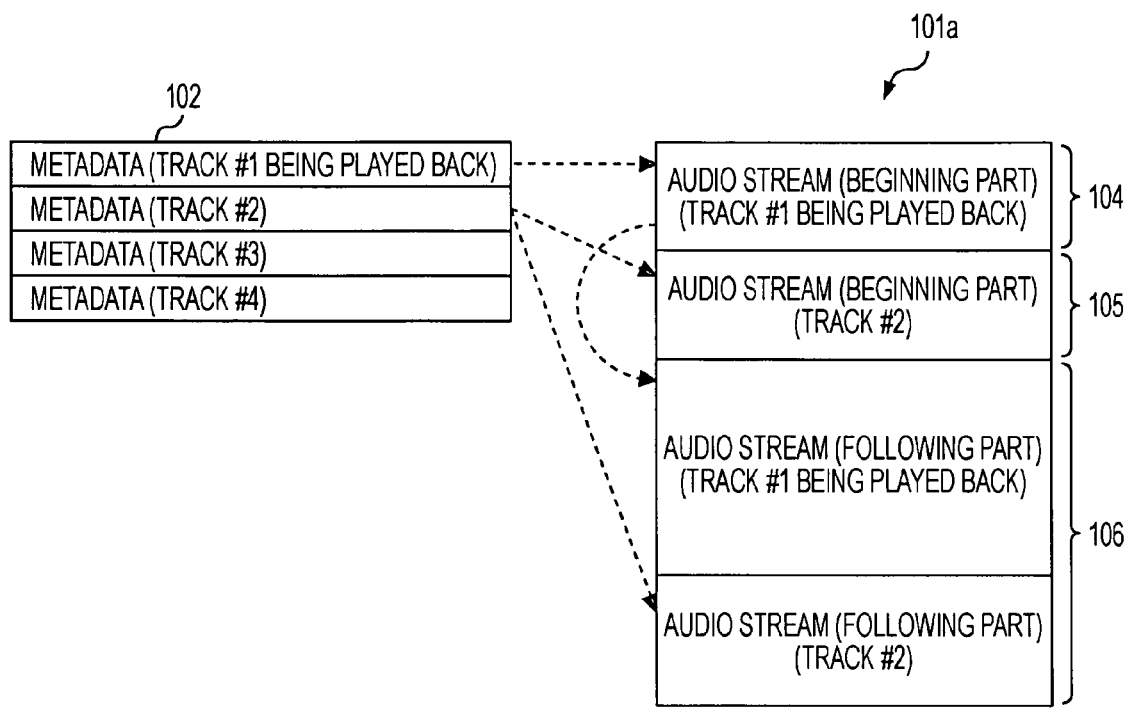
FIG. 14 illustrates an example of a configuration of a buffer of an audio playback apparatus and a manner of controlling the buffer according to an embodiment of the present invention.

FIG. 14 illustrates an example of a configuration of a buffer of an audio playback apparatus and a manner of controlling the buffer according to an embodiment of the present invention.

In the present embodiment, when a command to jump to a next music content or a command to replay the current music content from its beginning is issued in the middle of playback of the current music content, the requested playback operation is immediately executed. To achieve the above, as shown in FIG. 14, the audio buffer 101a for storing audio stream data is configured to have a plurality of storage areas: two starting-data storage areas 104 and 105 and the FIFO storage area 106.

The starting-data storage areas 104 and 105 each have a predetermined storage capacity, and data is stored therein in such a manner that a starting part with a predetermined data size of audio stream data being currently played back or a starting part with a predetermined data size of audio stream data to be played next are stored alternately in the starting-data storage areas 104 and 105. The data stored in these starting-data storage areas 104 and 105 are retained therein until the playback of the audio stream data stored therein is completed.

Of the total of audio stream data, data following the data stored in the starting-data storage areas 104 and 105 is sequentially stored in the FIFO storage area 106 The FIFO storage area 106 is implemented, for example, in the form of a ring buffer. That is, in the FIFO storage area 106, the data following the starting part of the audio stream data being in the playback operation, stored in the starting-data storage area 104 or 105, is sequentially stored. If the reception of the audio stream is completed, then, a part following the part of the audio stream data, to be played next, stored in the other one of the starting-data storage areas 104 and 105 is sequentially stored.

For example, in a case where an audio stream of a track #1 shown in FIG. 14 is played back, a request for transmission of an audio stream corresponding to the metadata of the track #1 stored in the meta buffer 102 is first sent to the server 1. The audio stream data transmitted in response to the request from the server 1 is received by the audio playback apparatus 3. The received audio stream data is stored in the starting-data storage area 104. If the starting-data storage area 104 is filled with data, the following audio stream data is stored into the FIFO storage area 106.

The audio decoder 38 first reads data from the starting-data storage area 104 and decodes the read data. If all data stored in the starting-data storage area 104 has been read, the data stored in the FIFO storage area 106 is read to continue the playback of the audio stream of the track #1. During the playback operation, if a command to replay the audio stream of the track #1 is issued by a user, the data stored in the starting-data storage area 104 is again supplied, starting from its beginning, to the audio decoder 38. This allows the replay to be performed immediately in response to the command without having to re-receive the starting part of the audio stream from the server 1. When the data is being read from the starting-data storage area 104, a request for re-transmission of the remaining part of the data is produced in accordance with the metadata of the track #1 and sent to the server 1. The data transmitted from the server 1 in response to the request for the re-transmission is stored in the flashed FIFO storage area 106 to continue the playback of the audio stream.

When the playback of the audio stream of the track #1 is started, the audio playback apparatus 3 executes a communication session separately from that of the track #1 with the server 1 to request the server 1 to transmit an audio stream corresponding to metadata of a track #2. Thus, the audio stream data of the track #2 is received in parallel with the data of the track #1. In the above data receiving process, the receiving rate of the audio stream of the track #1 may be detected, and the reception of the audio stream of the track #2 may be started only when the detected receiving rate of the audio stream of the track #1 is greater than a predetermined threshold.

The received audio stream data of the track #2 is stored in the starting-data storage area 105. When the starting-data storage area 105 is filled with the data, the reception of the audio stream data of the track #2 is temporarily stopped, and the following data is received and stored in the FIFO storage area 106 when a free storage space occurs in the FIFO storage area 106. This provides an advantage that when a command to jump to a next audio stream is issued during the playback of the audio stream of the track #1, the data of the audio stream of the track #2 can be supplied to the audio decoder 38 from the starting-data storage area 105 immediately in response to the command without having to receiving the starting part of the audio stream of the track #2 from the server 1.

If the playback of the audio stream of the track #2 is started, the following audio stream data is received from the server 1 and stored in the flashed FIFO storage area 106 to continue the playback of the audio stream.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus configured to receive stream data transmitted from a server connected to the playback apparatus via a network and play back the stream data, the playback apparatus comprising:
   attribute information request means for requesting the server to transmit attribute information associated with the stream data and receiving the attribute information in an order in which to play back the stream data;
   an attribute information buffer configured to temporarily store the attribute information sequentially received from the server and retain at least first attribute information associated with second stream data of a second content item to be played back next after first stream data of a first content item being currently played back;
   a stream data buffer of a first-in-first-out type configured to sequentially store the stream data received from the server and to sequentially output the stream data to playback processing means; and
   stream data request means for:
      requesting, on the basis of the attribute information stored in the attribute information buffer, the server to transmit selected stream data corresponding to the attribute information,
      reading the first attribute information from the attribute information buffer when an end part of the first stream data of the first content item being currently played back has been stored in the stream data buffer, the first attribute information being associated with the second stream data of the second content item,
      requesting, on the basis of the first attribute information, the server to transmit the second stream data of the second content item to be played back next, and
      causing the stream data buffer to store the requested second stream data of the second content item and the first stream data of the first content item.

2. The playback apparatus according to claim 1, wherein the attribute information buffer retains at least second attribute information associated with a predetermined number of other stream data to be sequentially played back after the first stream data being currently played back; and
   the stream data request means reads the attribute information from the attribute information buffer in the order in which to play back the stream data.

3. The playback apparatus according to claim 2, wherein the attribute information request means deletes a portion of the attribute information associated with the stream data from the attribute information buffer after the portion of the attribute information was referred to by the stream data request means to determine which stream to request the server to transmit and before the playback of the stream data is completed, and the attribute information request means requests the server to transmit new attribute information associated with new stream data to be played back after playback of all stream data corresponding to the attribute information stored in the attribute information buffer is completed, and stores the new attribute information transmitted from the server in response to the request in the attribute information buffer.

4. The playback apparatus according to claim 1, further comprising a cache memory configured to temporarily store a greater number of pieces of attribute information received from the server than the number of pieces of attribute information stored in the attribute information buffer and sequentially output the attribute information to the attribute information buffer in a first-in-first-out manner,
   wherein the attribute information request means, if all attribute information stored in the cache memory has been output to the attribute information buffer, requests the server to transmit as many pieces of attribute information as possible to be stored in the cache memory, for new stream data to be played following the first stream data corresponding to the first attribute information which has already been output from the cache memory, in the order in which to play stream data.

5. The playback apparatus according to claim 4, further comprising data discrimination means configured such that when the attribute information stored in the cache memory is output to the attribute information buffer, a determination is made on the basis of the attribute information as to whether the stream data corresponding to the attribute information is playable by the playback apparatus, and if the stream data is playable, the attribute information is directly output to the attribute information buffer, but otherwise the attribute information is not output but next attribute information is output from the cache memory.

6. The playback apparatus according to claim 5, wherein in the case where the determination made by the data discrimination means on the basis of the attribute information read from the cache memory is that the stream data corresponding to the attribute information is not playable, if all attribute information stored in the cache memory has already been output, the attribute information request means requests the server to transmit as many pieces of attribute information following the last attribute information already output from the cache memory as can be stored in the cache memory, in the order in which to playback stream data.

7. The playback apparatus according to claim 1, further comprising:
   a cache memory configured to temporarily store a greater number of pieces of attribute information received from the server than are stored in the attribute information buffer, and output the attribute information to the attribute information buffer;
   playback order number generation means for, when new attribute information is stored in the attribute information buffer, randomly generating playback numbers indicating the order in which to play back the stream data; and
   random playback control means configured such that the random playback control means determines whether the attribute information corresponding to the generated playback number is stored in the cache memory, and, if the attribute information is stored in the cache memory, the random playback control means outputs the attribute information from the cache memory to the attribute information buffer, but otherwise the random playback control means requests the attribute information request means to request the server to transmit as many pieces of attribute information starting with the attribute information corresponding to the generated playback number as can be stored in the cache memory.

8. The playback apparatus according to claim 1, wherein the stream data buffer is configured to have a starting-data storage area for storing a predetermined amount of data of a starting part of the first stream data being currently played back, and also have a first-in-first-out storage area for sequentially storing a following part of the stream data, and wherein
   the playback apparatus further comprises replay control means configured such that if a replay command is issued by a user in the middle of playback of the stream data, the replay control means re-supplies the data stored in the starting-data storage area starting from a beginning to the playback processing means, and the replay control means requests the stream data request means to request the server to re-transmit the part of the stream data following the data stored in the starting-data storage area.

9. The playback apparatus according to claim 1, wherein, the stream data buffer is configured to have a next-stream starting-data storage area for storing a predetermined amount of data of a starting part of a stream data to be played next, and also have a first-in-first-out storage area for storing other data, and wherein the playback apparatus further comprises jump playback control means configured such that if a jump playback command is issued by a user in the middle of playback of the stream data, the jump playback control means supplies the data stored in the next-stream starting-data storage area starting from the beginning to the playback processing means, and then requests the stream data request means to request the server to transmit a part of the stream data following the data stored in the next-stream starting-data storage area, and sequentially stores the stream data transmitted from the server in response to the request in the first-in-first-out storage area.

10. A method of controlling a playback process including receiving stream data transmitted from a server via a network and playing back the received stream data, comprising:
   by attribute information request means, requesting the server to transmit attribute information associated with the stream data and receiving the attribute information in the order in which to play back the stream data;
   by an attribute information buffer, temporarily storing the attribute information sequentially received from the server and retaining at least first attribute information associated with second stream data of a second content item to be played back next after first stream data of a first content item being currently played back;
   by stream data storage control means, sequentially storing the stream data received from the server in the stream data buffer in a first-in-first-out manner, and outputting the stream data stored in the stream data buffer to playback processing means;
   by stream data request means:
      specifying selected stream data in accordance with the attribute information stored in the attribute information buffer and requesting the server to transmit the selected stream data;
      reading the first attribute information from the attribute information buffer when an end part of the first stream data of the first content item being currently played back has been stored in the stream data buffer, the first attribute information being associated with second stream data of the second content item to be played next;
      requesting, on the basis of the first attribute information, the server to transmit the second stream data of the second content item to be played back next; and
      causing the stream data buffer to store the requested second stream data of the second content item and the first stream data of the first content item.

11. A playback apparatus configured to receive stream data transmitted from a server connected to the playback apparatus via a network and play back the received stream data, comprising:
   an attribute information requesting unit configured to request the server to transmit attribute information associated with the stream data and receiving the attribute information in the order in which to play back the stream data;
   an attribute information buffer configured to temporarily store attribute information sequentially received from the server and retain at least first attribute information associated with second stream data of a second content item to be played back next after first stream data of a first content item being currently played back;
   a stream data requesting unit configured to request, on the basis of the attribute information stored in the attribute information buffer, the server to transmit selected stream data corresponding to the attribute information; and
   a stream data buffer of a first-in-first-out type configured to sequentially store the stream data received from the server and sequentially output the stream data to a playback unit;
   wherein the stream data requesting unit reads the first attribute information from the attribute information buffer when an end part of the first stream data of the first content item being currently played back has been stored in the stream data buffer, the first attribute information being associated with the second stream data of the second content item to be played next from the attribute information buffer, and requests, on the basis of the first attribute information, the server to transmit the second stream data of the second content item to be played back next.

* * * * *